(12) United States Patent
Ueno et al.

(10) Patent No.: US 12,517,687 B2
(45) Date of Patent: Jan. 6, 2026

(54) IMAGE FORMING APPARATUS, NON-TRANSITORY COMPUTER READABLE MEDIUM, AND METHOD FOR STOPPING PRINTING

(71) Applicant: FUJIFILM BUSINESS INNOVATION CORP., Tokyo (JP)

(72) Inventors: Kunikazu Ueno, Kanagawa (JP); Kohshiro Inomata, Kanagawa (JP); Kengo Tokuchi, Tokyo (JP); Takahiro Okayasu, Tokyo (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 497 days.

(21) Appl. No.: 17/939,292

(22) Filed: Sep. 7, 2022

(65) Prior Publication Data
US 2023/0305782 A1    Sep. 28, 2023

(30) Foreign Application Priority Data
Mar. 24, 2022 (JP) ................................ 2022-049114

(51) Int. Cl.
G06F 3/12 (2006.01)

(52) U.S. Cl.
CPC .......... G06F 3/1274 (2013.01); G06F 3/1203 (2013.01); G06F 3/1234 (2013.01)

(58) Field of Classification Search
CPC ..... G06F 3/1274; G06F 3/1203; G06F 3/1234
See application file for complete search history.

(56) References Cited

U.S. PATENT DOCUMENTS

2005/0024673 A1* 2/2005 Sakai ..................... G06F 3/1274
                                                                358/1.14
2016/0182744 A1* 6/2016 Morota ................. G06F 3/1285
                                                                358/1.15

FOREIGN PATENT DOCUMENTS

JP          2012-038115 A        2/2012

* cited by examiner

Primary Examiner — Ibrahim Siddo
(74) Attorney, Agent, or Firm — Oliff PLC

(57) ABSTRACT

An image forming apparatus includes a processor configured to command a second image forming apparatus, if the second image forming apparatus exists, to stop printing a second document related to a first document when a stoppage of printing of the first document is received, the second image forming apparatus being responsible for printing the second document.

16 Claims, 21 Drawing Sheets

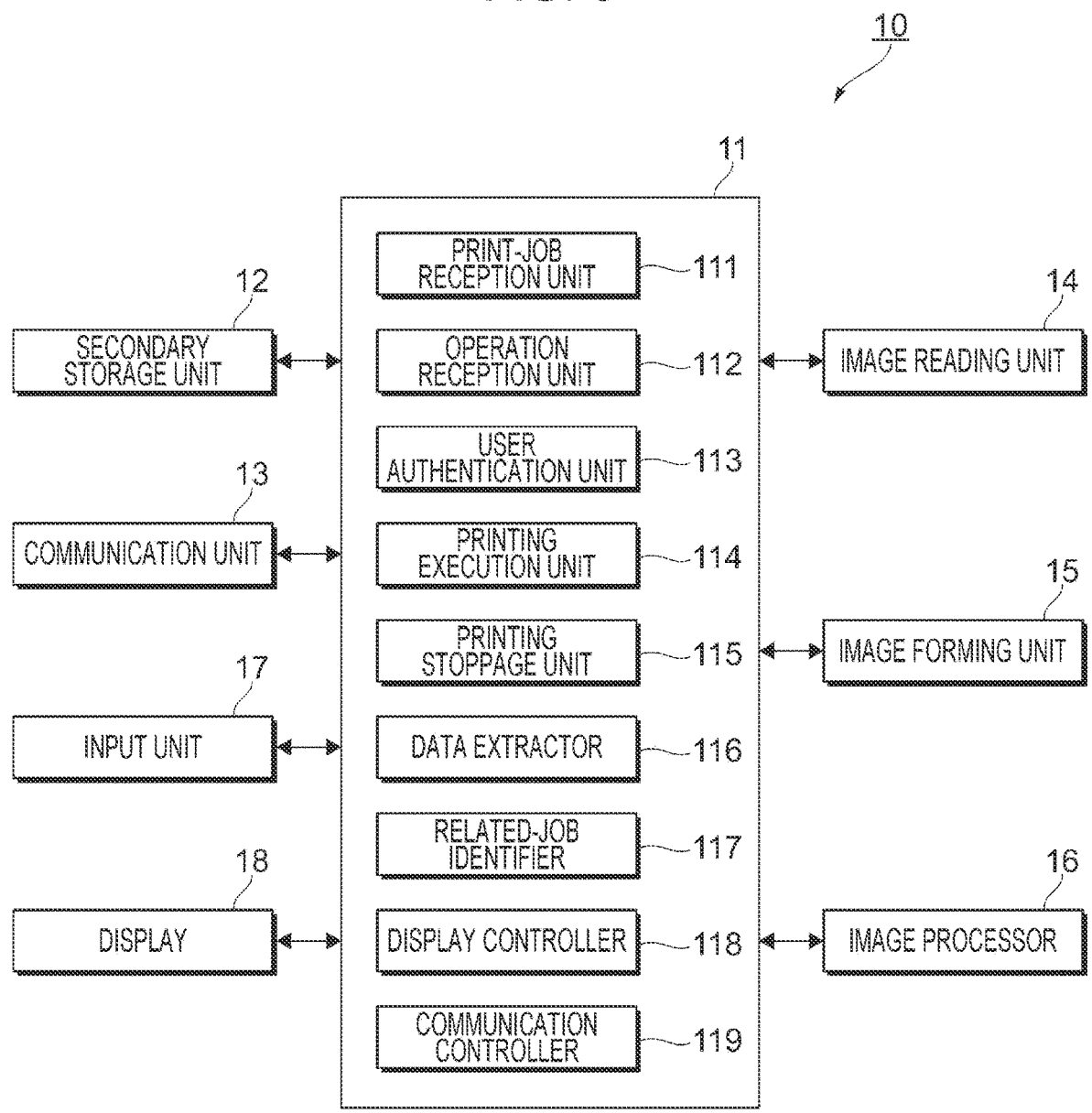

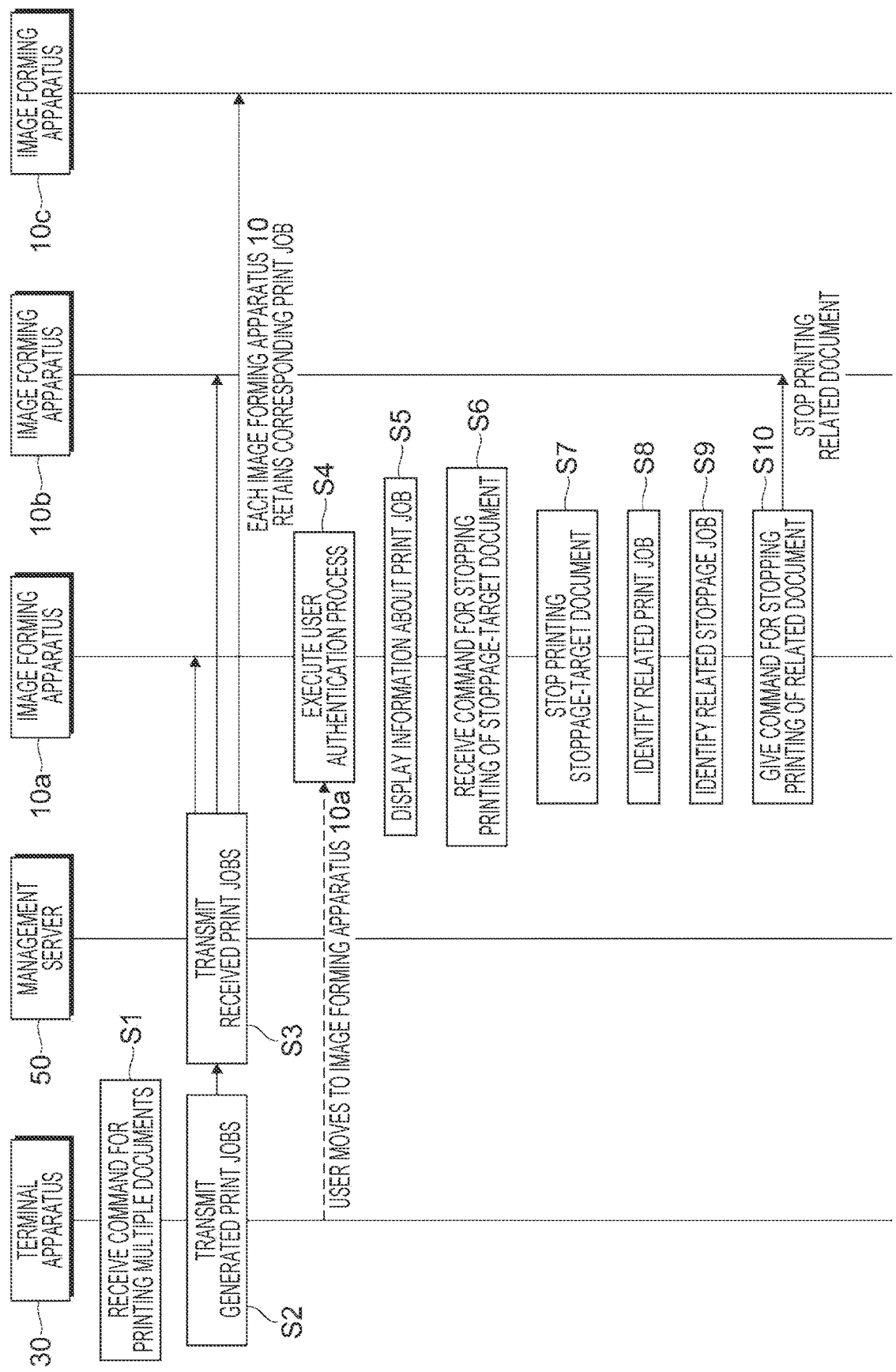

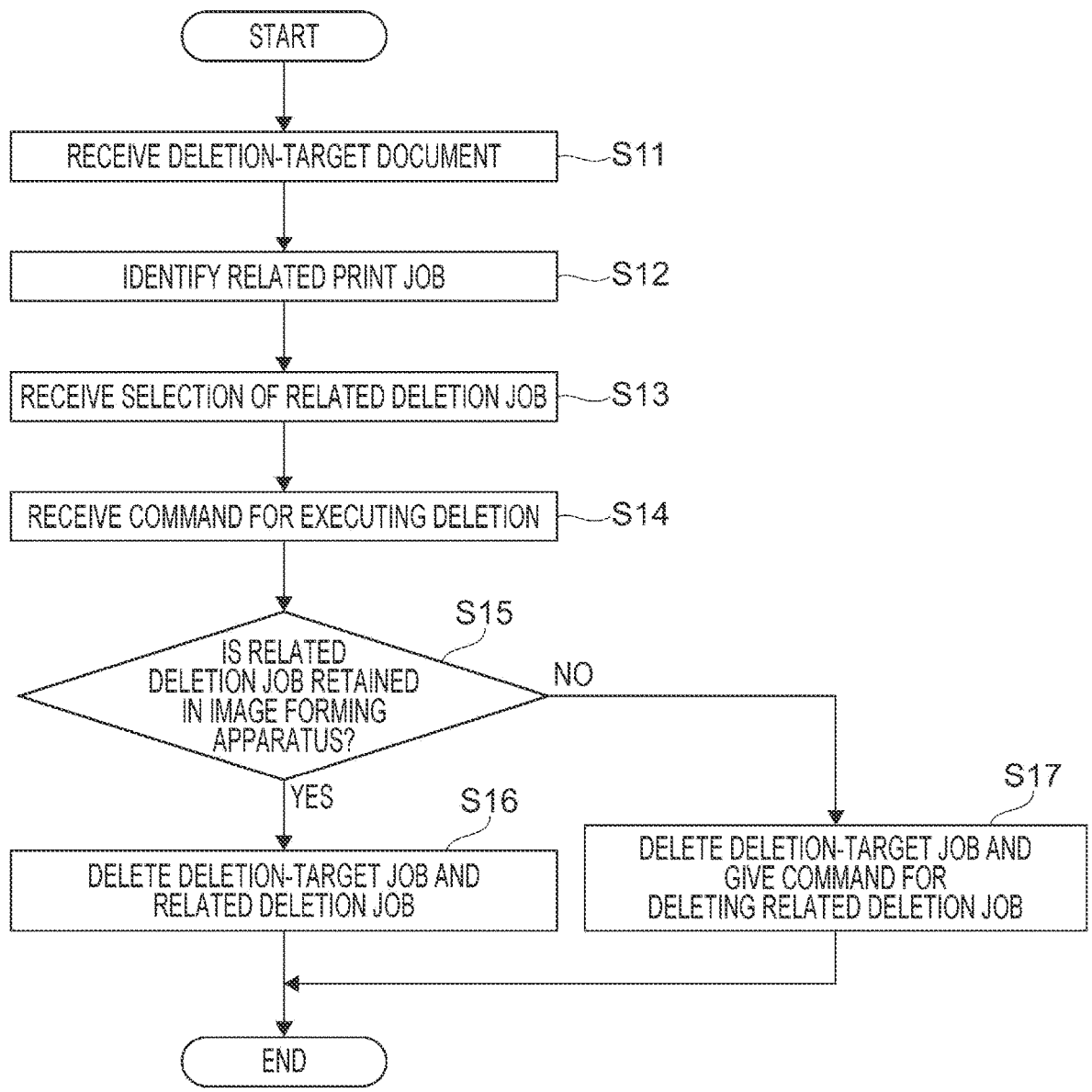

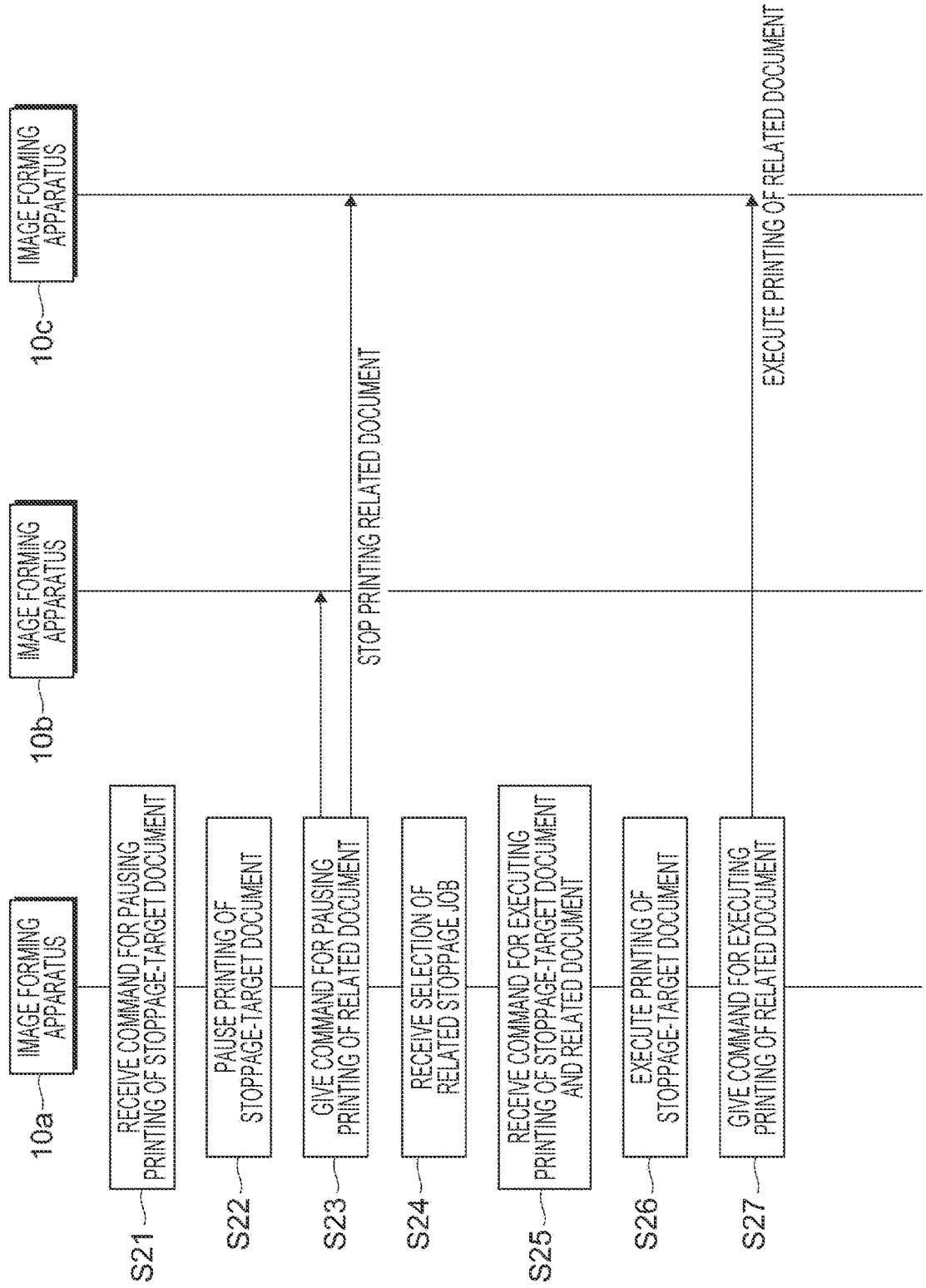

IMAGE FORMING APPARATUS, NON-TRANSITORY COMPUTER READABLE MEDIUM, AND METHOD FOR STOPPING PRINTING

CROSS-REFERENCE TO RELATED APPLICATIONS

This application is based on and claims priority under 35 USC 119 from Japanese Patent Application No. 2022-049114 filed Mar. 24, 2022.

BACKGROUND

(i) Technical Field

The present disclosure relates to image forming apparatuses, non-transitory computer readable media, and methods for stopping printing.

(ii) Related Art

Japanese Unexamined Patent Application Publication No. 2012-38115 describes an image forming apparatus in which, when the image forming apparatus receives a reprinting command for print data that has been cancelled halfway during printing, the image forming apparatus acquires a final page obtained in the previous printing process, identifies a page from which the reprinting process is to be commenced in accordance with the acquired final page obtained in the previous printing process, and performs a reprinting process from the identified page.

SUMMARY

For example, a clerical error may sometimes be found after a command for printing a document is given. In this case, a user may operate the image forming apparatus that has received the document printing command, so as to stop the execution of the printing process. This may similarly occur when the document printing command is given to multiple image forming apparatuses. In this case, the user has to sequentially move to the locations where the image forming apparatuses are installed to stop the execution of the document printing process.

Aspects of non-limiting embodiments of the present disclosure relate to enhancing user workability, as compared with a case where an operation for stopping printing of related documents has to be performed by moving to the locations where the multiple image forming apparatus are installed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to command a second image forming apparatus, if the second image forming apparatus exists, to stop printing a second document related to a first document when a stoppage of printing of the first document is received, the second image forming apparatus being responsible for printing the second document.

BRIEF DESCRIPTION OF THE DRAWINGS

Exemplary embodiments of the present disclosure will be described in detail based on the following figures, wherein:

FIG. 3 illustrates a functional configuration of each image forming apparatus according to the first exemplary embodiment;

FIG. 6 illustrates an example of a process in which an image forming apparatus commands another image forming apparatus to stop printing in a processing sequence according to the first exemplary embodiment;

FIG. 10 is a flowchart illustrating the flow of a process in which the image forming apparatus according to the first exemplary embodiment commands another image forming apparatus to delete a related print job;

FIG. 13 illustrates an example of a process in which the image forming apparatus commands another image forming apparatus to execute printing in a processing sequence according to the first exemplary embodiment;

DETAILED DESCRIPTION

Exemplary embodiments of the present disclosure will be described below with reference to the appended drawings.

First Exemplary Embodiment

Information Processing System 1

Figure 1:
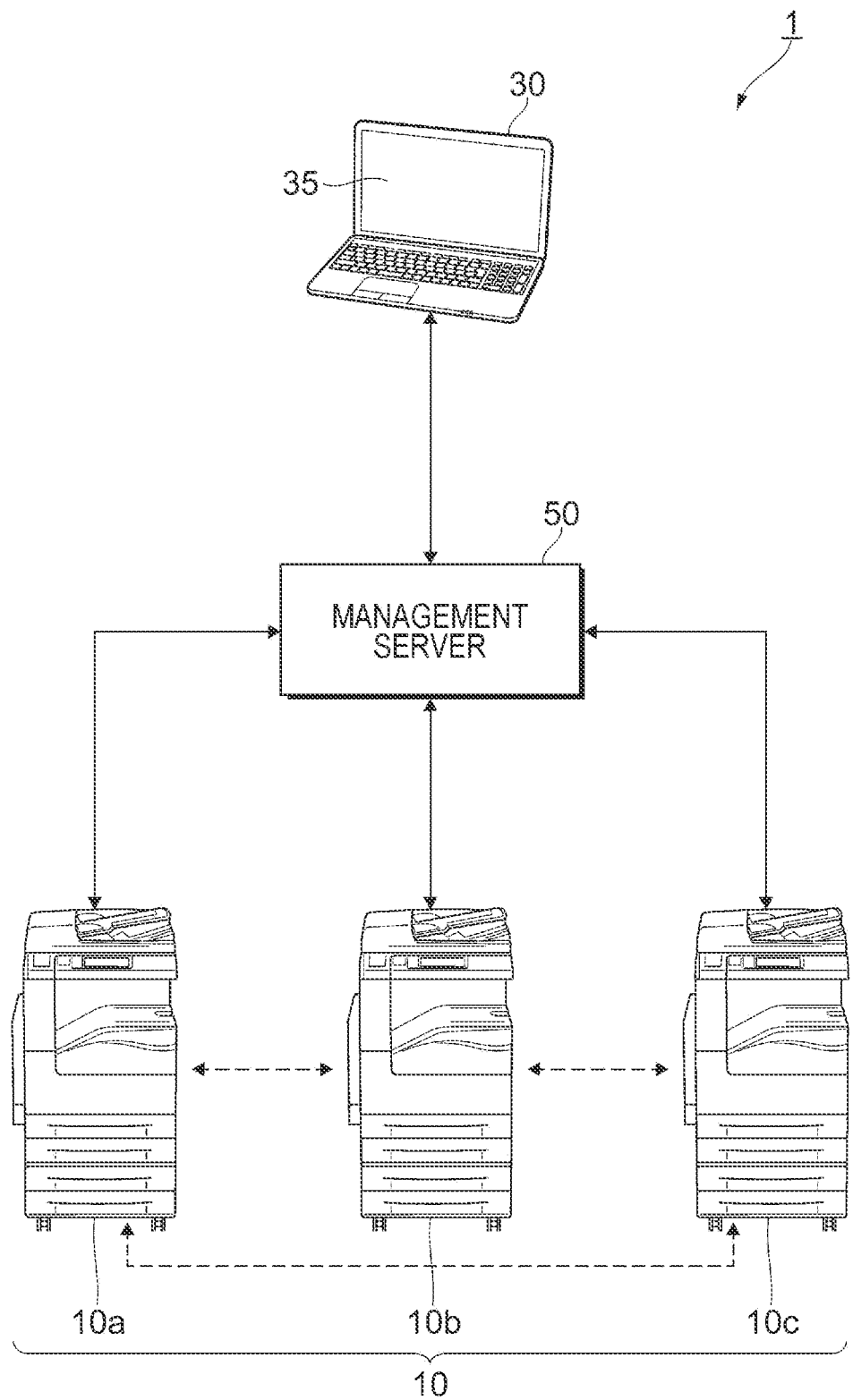
FIG. 1 illustrates an overall configuration example of an information processing system according to a first exemplary embodiment.

FIG. 1 illustrates an overall configuration example of an information processing system 1 according to a first exemplary embodiment.

The information processing system 1 includes image forming apparatuses 10 (10a, 10b, and 10c) each having a function for forming an image based on a print job, a terminal apparatus 30 to be operated by a user, and a management server 50 that transmits a registered print job from the terminal apparatus 30 to any of the image forming apparatuses 10 serving as a designated destination. In the information processing system 1, the image forming apparatuses 10, the terminal apparatus 30, and the management server 50 are capable of exchanging information with one another via a communication line (not shown). In this exemplary embodiment, the communication line is not particularly limited so long as it realizes information communication among the apparatuses, and may be, for example, the Internet, near-field communication, a telephone line, or a combination thereof.

In this exemplary embodiment, a print job is information including a data file of a document designated as an object to be printed and setting information that sets operational conditions of the image forming apparatus 10 printing the document. A print job is an example of a command for printing a document.

A document is an electronic document and may include an image in addition to text, or may include an image alone without including text. In addition to image data and/or document data, a document data file may contain image information to be used when converting document data into an image, as well as attribute information, such as the update time of the electronic document, the sheet size, the number of pages, and a keyword within the electronic document.

Each image forming apparatus 10 according to this exemplary embodiment executes the print job retained therein based on an operation performed by the user using the information processing system 1. For example, each image forming apparatus 10 has a basic function to be used for forming an image onto a sheet or another type of recording medium.

Furthermore, each image forming apparatus 10 has a communication function connectable to the Internet via a wide area network (WAN) or a local area network (LAN) and a communication function connectable to a telephone network.

Moreover, each image forming apparatus 10 may have a communication function connectable to another image forming apparatus 10 without the intervention of the terminal apparatus 30 or the management server 50 and a function for acquiring information about the user operating the image forming apparatus 10.

In this exemplary embodiment, the communication line used for information communication may have a wired or wireless configuration, or may be a combination thereof.

In the case of FIG. 1, the information processing system 1 has three image forming apparatuses 10 disposed therein. However, the number of image forming apparatuses 10 is not limited to the example in this exemplary embodiment.

The terminal apparatus 30 according to this exemplary embodiment is a terminal that transmits a print job to any of the image forming apparatuses 10 via the management server 50. The terminal apparatus 30 is provided with a display 35 formed of a liquid crystal display panel or an organic electroluminescence (EL) display panel that displays image and text information to the user.

The terminal apparatus 30 may be, for example, a computer, a tablet information terminal, a smartphone, or another type of information processing apparatus.

In the case of FIG. 1, the information processing system 1 has a single terminal apparatus 30 disposed therein, but may alternatively have multiple terminal apparatuses 30 disposed therein.

The management server 50 according to this exemplary embodiment provides a service that transmits a print job uploaded and registered from the terminal apparatus 30 to any of the image forming apparatuses 10. This service includes the management server 50 managing the print job.

For example, the management server 50 is realized by a server machine, such as a computer, but the number of server machines is not limited. Alternatively, for example, the function of the management server 50 may be implemented by distributing the management server 50 to multiple virtual server machines in a so-called cloud environment.

In the following description, it is assumed that the user who has transmitted a print job from the terminal apparatus 30 to any of the image forming apparatuses 10 moves to the location where the image forming apparatus 10 retaining this print job is installed to individually give a command for executing or stopping the print job.

In this exemplary embodiment, the image forming apparatus 10 performs a user authentication process and permits execution of the print job registered by the authenticated user.

The general outline of the functions of each image forming apparatus 10 in the information processing system 1 according to this exemplary embodiment will now be described.

The image forming apparatus 10 retains the print job acquired from the user's terminal apparatus 30 via the management server 50. In accordance with an operation performed on the image forming apparatus 10 by the user, the image forming apparatus 10 executes or stops the print job retained therein. The image forming apparatus 10 operated by the user commands another image forming apparatus 10 to stop another print job related to the stopped print job. In other words, the image forming apparatus 10 that has received a command for stopping printing of a first document from the user commands another image forming apparatus 10 responsible for printing a second document related to this first document to stop printing the second document.

Each image forming apparatus 10 according to this exemplary embodiment has the above-described functions, so that the user confirms, at one of the image forming apparatuses 10, information about a print job retained in another image forming apparatus 10 and gives a command for executing or stopping the confirmed print job. In detail, in this exemplary embodiment, the user does not have to move to locations where the individual image forming apparatuses 10 are installed to individually give commands for executing or stopping print jobs.

This exemplary embodiment may reduce the time and effort used by the user for moving to locations where the individual image forming apparatuses 10 are installed, thereby contributing to enhanced user workability.

The information processing system 1 according to this exemplary embodiment will be described in detail below.

Image Forming Apparatus 10

Figure 2:
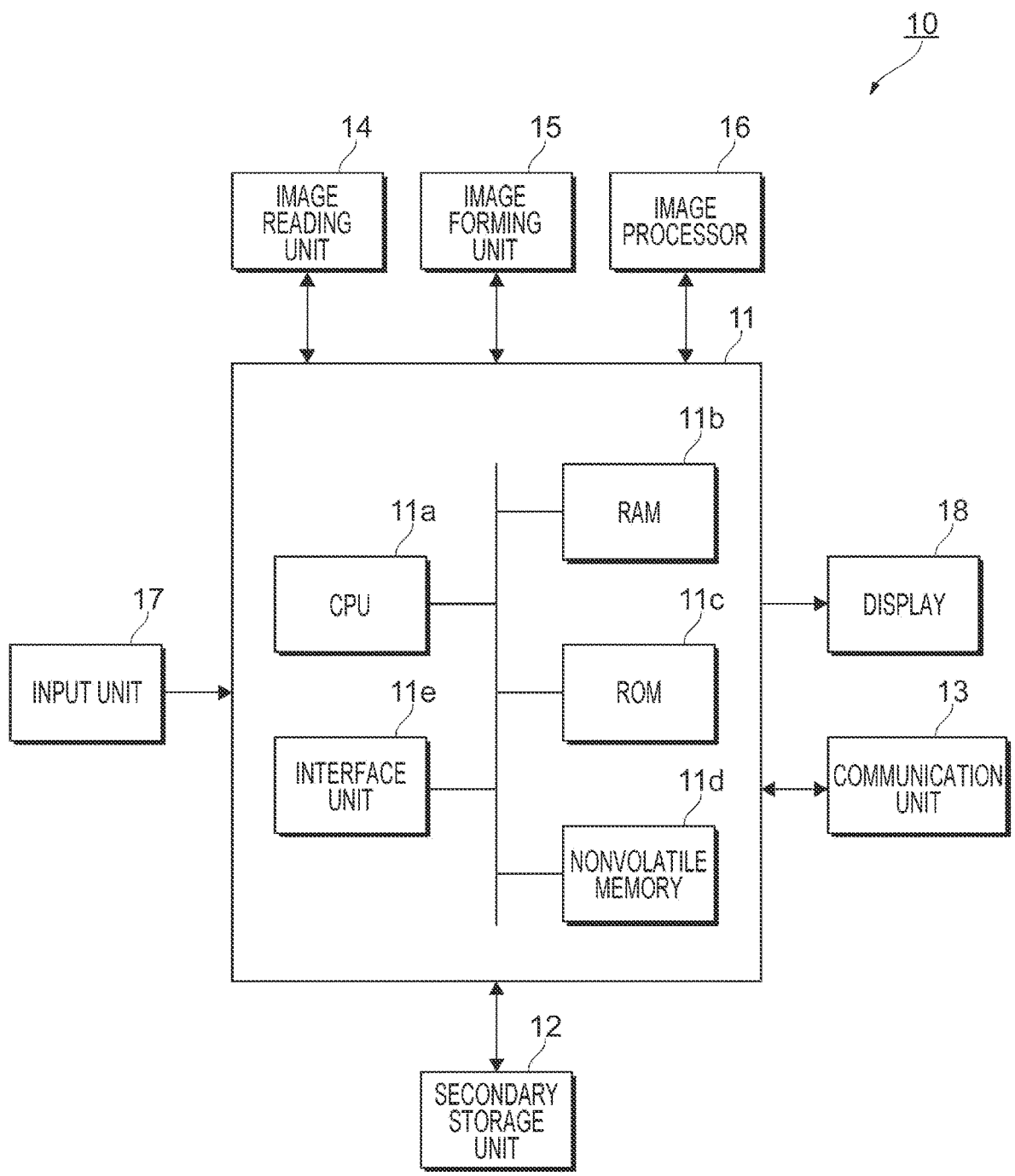
FIG. 2 illustrates a configuration example of each image forming apparatus according to the first exemplary embodiment.

FIG. 2 illustrates a configuration example of each image forming apparatus 10 according to the first exemplary embodiment.

Each image forming apparatus 10 includes a controller 11 that controls the overall operation of the image forming apparatus 10, a secondary storage unit 12 that stores, for example, image data, a communication unit 13 that realizes communication with another apparatus, an image reading unit 14 that reads an image of a document, an image forming unit 15 that forms an image onto a sheet as an example of a recording medium, and an image processor 16 that performs an additional process, such as color correction and gray-level correction, on image data and/or document data.

The controller 11 and each of the remaining units are connected to each other via a bus or a signal line.

The controller 11 includes a central processing unit (CPU) 11a serving as an example of a processor that controls the entire image forming apparatus 10, a random access memory (RAM) 11b used as a work memory of the CPU 11a, and a read-only memory (ROM) 11c that stores, for example, a program to be executed by the CPU 11a. Moreover, the controller 11 includes a nonvolatile memory 11d that is rewritable and that is capable of retaining data even when not supplied with electric power, and an interface unit 11e that controls each unit, such as the communication unit 13, connected to the controller 11.

The nonvolatile memory 11d is constituted of, for example, a static random access memory (SRAM) or a flash memory backed up by a battery, and stores association information that associates a print job and a document corresponding to the print job with each other. The controller 11 reads a program stored in the secondary storage unit 12, so that each process of the image forming apparatus 10 according to this exemplary embodiment is executed.

The secondary storage unit 12 is constituted of, for example, a hard disk drive (HDD) or a semiconductor memory serving as a nonvolatile storage device. The secondary storage unit 12 stores, for example, image data read by the image reading unit 14, facsimile (FAX) data received via FAX communication, and image data received from the outside via communication. A part of the image data received from the outside via communication is the document data file included in the print job received via the management server 50. As mentioned above, the data of the document serving as a target of the print job is not limited to image data and may include document data. Additionally, for example, a program to be executed by the controller 11, a print job, user information, and association information are stored in the secondary storage unit 12.

The communication unit 13 has a mechanism according to not only communication with the terminal apparatus 30 or the management server 50 but also communication with another image forming apparatus 10.

The image reading unit 14 is a so-called scanner that corresponds to both a mode for reading an image while moving a reader relative to a document in a stationary state and a mode for reading the image while moving the document relative to the reader in a stationary state.

The image forming unit 15 forms an image onto a recording medium, such as a sheet, and has a mechanism according to the image forming method. A recording material used may be, for example, toner or ink.

The image processor 16 is constituted of a dedicated processor or processing circuit for processing image data.

An input unit 17 includes, for example, a switch, a button, and/or a touchscreen for receiving an input operation from the user. Additionally, the input unit 17 may have, for example, a code reader corresponding to code information, such as a bar code or a QR code (registered trademark), a card reader corresponding to an integrated circuit (IC) card, such as an employee ID card, and/or a sensor that reads biological information, such as user's fingerprint or veins. Furthermore, the input unit 17 may have a communication device that wirelessly communicates with a user terminal (not shown) via Bluetooth (registered trademark) or NFC (near-field communication).

In accordance with an operation performed by the user via the input unit 17, a position on a display screen displayed on a display 18 may be designated or an image displayed on the display 18 may be designated.

Alternatively, in accordance with an operation performed by the user via the input unit 17, user information about the user may be acquired.

If the input unit 17 is a touchscreen, the input unit 17 is integrated with the display 18.

FIG. 3 illustrates a functional configuration of each image forming apparatus 10 according to the first exemplary embodiment.

The controller 11 according to this exemplary embodiment functions as a print-job reception unit 111 that executes a process for receiving a print job, an operation reception unit 112 that executes a process for receiving an operation performed by the user, a user authentication unit 113 that performs a user authentication process, a printing execution unit 114 that manages execution of printing of a document, and a printing stoppage unit 115 that manages stoppage of printing of the document. Furthermore, the controller 11 functions as a data extractor 116 that extracts a document data file from a print job, a related-job identifier 117 that identifies a print job related to a print job corresponding to a document for which printing has been stopped, a display controller 118 that controls an image displayed on the display 18, and a communication controller 119 that controls communication with another apparatus.

The print-job reception unit 111 manages a print job received via the communication unit 13. The print-job reception unit 111 causes the secondary storage unit 12 to store the received print job together with the user information about the user who has given a command for registering this print job.

The print-job reception unit 111 does not have to determine the reception path of the print job. In other words, the print-job reception unit 111 does not have to determine whether the print job is received via the management server 50 (see FIG. 1) or via another reception path. Examples of another reception path include a reception path from the terminal apparatus 30 (see FIG. 1) without the intervention of the management server 50 and a reception path via another image forming apparatus 10. In this exemplary embodiment, the received print job uniformly undergoes the same process.

The operation reception unit 112 receives a user command in accordance with an operation performed by the user via the input unit 17. Examples of this user command include a command for executing the print job, a command for displaying a preview image indicating the content of the document corresponding to the print job, and a command for stopping the print job.

The user authentication unit 113 executes an authentication process for identifying the user who is trying to operate the image forming apparatus 10. For example, the user authentication unit 113 executes the authentication process by acquiring user information for identifying the user from code information, an IC card, a part of the user's body, or a wireless-communicable terminal. Alternatively, for example, the user authentication unit 113 may execute the authentication process by acquiring an ID and a password based on an operation performed by the user via the input unit 17.

The printing execution unit 114 reads the received print job from the secondary storage unit 12. The printing execution unit 114 gives a command for executing the read print job based on a user command or a command from another image forming apparatus 10. In detail, the printing execution unit 114 reads the print job registered by the user from the secondary storage unit 12 and commands the image forming unit 15 to execute printing with respect to the print job corresponding to the printing execution command given by the user.

The printing stoppage unit 115 gives a command for stopping the print job that the image forming apparatus 10 is responsible for based on a user command or a command from another image forming apparatus 10. More specifically, based on a command received from the user or from another image forming apparatus 10, the printing stoppage unit 115 commands the image forming unit 15 to stop printing with respect to the print job retained in the image forming apparatus 10.

Furthermore, the printing stoppage unit 115 gives a command for stopping a print job (referred to as "related stoppage job" hereinafter) to be stopped in relation to the stoppage of the print job (referred to as "stoppage-target job" hereinafter) corresponding to the stoppage command given by the user.

Moreover, based on a predetermined condition, the printing stoppage unit 115 gives a command for deleting a print job (referred to as "related print job" hereinafter) related to the stoppage-target job corresponding to the stoppage command given by the user and a command for deleting the related stoppage job. Examples of this predetermined condition include a case where the user deletes the related print job and a case where the user selects deletion of the related stoppage job.

The data extractor 116 extracts a document data file from the print job. As mentioned above, the print job is constituted of a document data file and setting information. The extracted data file is transmitted to the related-job identifier 117.

The related-job identifier 117 identifies that a print job including a data file related to the document data file extracted from the stoppage-target job is a related print job. More specifically, the related-job identifier 117 identifies that a print job including a data file satisfying a specific condition is a related print job related to the document data file extracted from the stoppage-target job.

An example of the specific condition includes a case where the document data file has a filename including at least a part of the filename of the document (referred to as "stoppage-target document" hereinafter) corresponding to the stoppage-target job. For example, a filename "review B" including "review" in the filename is identified as a related print job related to a stoppage-target job corresponding to a filename "review A". Alternatively, a print job corresponding to a filename "REVIEW A" may be identified as a related print job related to the stoppage-target job corresponding to the filename "review A".

Another example of the specific condition includes a case where a relationship with the stoppage-target document is confirmed, such as a case where there are matching or similar keywords, pictures, and/or symbols within documents corresponding to respective print jobs.

The differentiation of capital letters, small letters, and honorific titles is not particularly limited and may be set in advance by the user.

Furthermore, the related-job identifier 117 may identify a related stoppage job to be stopped in relation to the stoppage of the stoppage-target job from related print jobs. In other words, the related-job identifier 117 may partially or entirely identify the related print jobs as a related stoppage job or jobs to be stopped in relation to the stoppage of the stoppage-target job corresponding to the stoppage command given by the user.

More specifically, the related-job identifier 117 may determine whether or not each related print job is a print job corresponding to a stoppage command in relation to the stoppage of the stoppage-target job and identify that the related print job is a related stoppage job.

In this exemplary embodiment, two criteria are prepared as specific criteria for a related stoppage job. One criterion corresponds to a first printing-stoppage-related condition, and the other criterion corresponds to a second printing-stoppage-related condition.

The first printing-stoppage-related condition is for identifying that a related print job is not a related stoppage job to be stopped in relation to the stoppage of the stoppage-target job.

On the other hand, the second printing-stoppage-related condition is for identifying that a related print job is a related stoppage job to be stopped in relation to the stoppage of the stoppage-target job.

An example of the first printing-stoppage-related condition is a case where the related print job is not affected by the cause of the stoppage of the stoppage-target job. In other words, for example, in this condition, printing of the document (referred to as "related document" hereinafter) corresponding to the related print job is not affected by the cause of the stoppage of printing of the stoppage-target document.

The stoppage of the stoppage-target job may be caused due to, for example, incompleteness, such as a clerical error, in the stoppage-target document, a change in a page or pages to be printed, an error in the sheet size to be printed, or an error in the number of copies to be printed.

For example, it is assumed that the user gives a command for stopping printing of a document due to a clerical error in the stoppage-target document.

In this case, if the related document does not have text identical to the clerical error, this related print job is not affected by the cause of the stoppage of the stoppage-target job and is identified as not being a related stoppage job.

In contrast, if the related document has text identical to the clerical error, this related print job is affected by the cause of the stoppage of the stoppage-target job and is possibly identified as being a related stoppage job. If the text identical to the clerical error is proper text in the related document, this related print job is not affected by the cause of the stoppage of the stoppage-target job and may be identified as not being a related stoppage job.

An example of the second printing-stoppage-related condition is a case where the related print job is affected by the cause of the stoppage of the stoppage-target job. In other words, for example, in this condition, printing of the related document is affected by the cause of the stoppage of printing of the stoppage-target document.

For example, it is assumed that the user gives a command for stopping printing of a document due to a clerical error in the stoppage-target document.

In this case, if the related document has text identical to the clerical error, this related print job is affected by the cause of the stoppage of the stoppage-target job and is identified as being a related stoppage job.

In contrast, if the related document does not have text identical to the clerical error, this related print job is not affected by the cause of the stoppage of the stoppage-target job and is identified as not being a related stoppage job. If the related document has text similar to or related to the clerical error, this related print job is affected by the cause of the stoppage of the stoppage-target job and may be identified as being a related stoppage job.

The classification of print jobs retained in the image forming apparatus 10 will now be described.

Figure 4A:
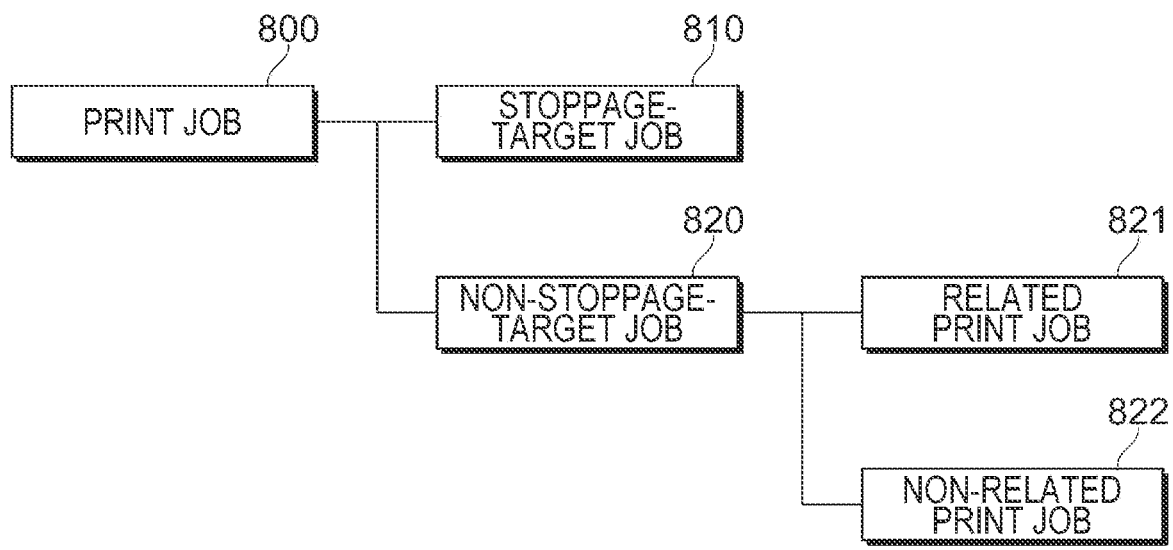
FIGS. 4A and 4B illustrate examples of how print jobs are classified, FIG. 4A illustrating an example of how a print job is classified based on a stoppage command given by a user, FIG. 4B illustrating an example of how a related print job is classified.
Figure 4B:
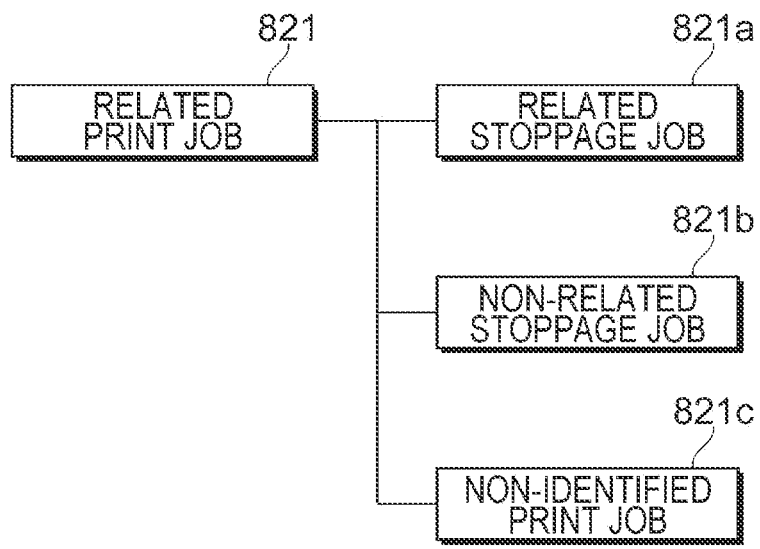

FIGS. 4A and 4B illustrate examples of how print jobs are classified. Specifically, FIG. 4A illustrates an example of how a print job is classified based on a stoppage command given by the user, and FIG. 4B illustrates an example of how a related print job is classified.

In FIG. 4A, a print job 800 retained in the image forming apparatus 10 is classified in accordance with a user operation.

In this exemplary embodiment, the print job 800 is classified into a stoppage-target job 810 for which the user has given a stoppage command and a non-stoppage-target job 820 for which the user has not given a stoppage command. In other words, a document for which the image forming apparatus 10 retains print-job-related information is classified into a stoppage-target document and a document (referred to as "non-stoppage-target document" hereinafter) corresponding to the non-stoppage-target job 820.

Among documents that the image forming apparatus 10 operated by the user is responsible for printing, the stoppage-target document as an example of a first document is a document for which the user has given a printing stoppage command. On the other hand, the non-stoppage-target document is a document for which the user has not given a printing stoppage command.

The non-stoppage-target job 820 is further classified into a related print job 821 for which the user has not given a stoppage command but that is related to the stoppage-target job 810 and a non-related print job 822 that is not related to the stoppage-target job 810. In other words, the non-stoppage-target document is classified into a related document and a document (referred to as "non-related document" hereinafter) corresponding to the non-related print job 822.

The related document as an example of a second document is a document related to the stoppage-target document. On the other hand, the non-related document is a document not related to the stoppage-target document.

In FIG. 4B, the related print job 821 is further classified in accordance with specific criteria.

In this exemplary embodiment, the related print job 821 is classified into a related stoppage job 821*a* that satisfies the first printing-stoppage-related condition and a non-related stoppage job 821*b* that satisfies the second printing-stoppage-related condition. More specifically, the related print job 821 is classified into the related stoppage job 821*a* of a related document for which printing is to be stopped in relation to the stoppage-target job 810 and the non-related stoppage job 821*b* of a related document for which printing is not to be stopped.

In this exemplary embodiment, the first printing-stoppage-related condition and the second printing-stoppage-related condition are prepared as the specific criteria for the related stoppage job 821*a*. Accordingly, the accuracy for identifying the related stoppage job 821*a* may be enhanced.

The specific criteria for the related stoppage job 821*a* may include a single condition alone, or may include or three or more conditions.

It is also assumable that the related print job 821 is not classifiable whether it is a related print job satisfying which one of the two conditions. In this case, the related print job 821 may be classified as a non-identified print job 821*c* not yet identified as the related stoppage job 821*a* or the non-related stoppage job 821*b*. This non-identified print job 821*c* may be presented to the user to request the user to identify whether or not it is the related stoppage job 821*a*.

Alternatively, all related print jobs 821 may be presented to the user, and the related print job 821 selected by the user from these related print jobs 821 may be set as the related stoppage job 821*a*.

The display controller 118 shown in FIG. 3 controls the displaying of an image to be displayed on the display 18.

The display controller 118 controls the displaying of an image that receives a user operation related to execution of a print job, as well as the displaying of an image that receives a user operation related to a stoppage of the print job. Furthermore, the display controller 118 controls the displaying of information about a print job retained in the image forming apparatus 10, as well as the displaying of a preview image corresponding to this print job.

In addition to the print job retained in the image forming apparatus 10, the display controller 118 may display a print job retained in another image forming apparatus 10.

The communication controller 119 receives information about a print job from another apparatus. In detail, the communication controller 119 acquires, via the communication unit 13, not only a print job, but also a command for executing, stopping, or deleting the print job.

Furthermore, the communication controller 119 transmits information about a print job to another apparatus. In detail, the communication controller 119 transmits a command for executing, stopping, or deleting the print job to another image forming apparatus 10 via the communication unit 13.

Moreover, if the user who has stopped the stoppage-target job and the user who has registered the related stoppage job are different from each other, the communication controller 119 may provide a notification to the user who has registered the related stoppage job.

Figure 5:
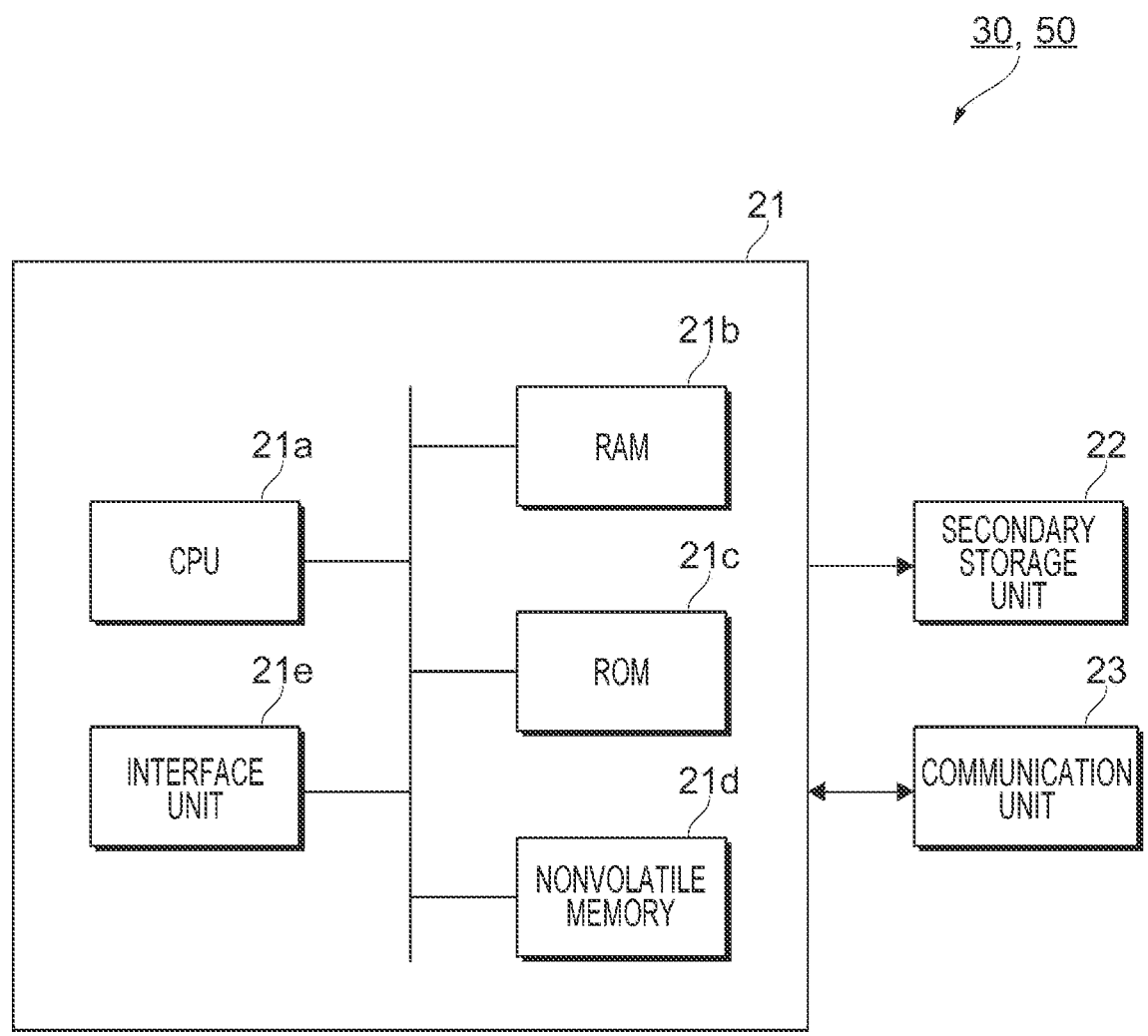
FIG. 5 illustrates a configuration example of a terminal apparatus and a management server according to the first exemplary embodiment.

Terminal Apparatus 30 and Management Server 50 FIG. 5 illustrates a configuration example of the terminal apparatus 30 and the management server 50 according to the first exemplary embodiment.

Each of the terminal apparatus 30 and the management server 50 according to this exemplary embodiment includes a controller 21 that controls the overall operation of the apparatus, a secondary storage unit 22 that stores, for example, a document and a print job, and a communication unit 23 that transmits and receives information via a communication line.

The controller 21 includes a CPU 21a serving as an example of a processor that controls the entire apparatus, a RAM 21b used as a work memory of the CPU 21a, and a ROM 21c that stores, for example, a program to be executed by the CPU 21a. Moreover, the controller 21 includes a nonvolatile memory 21d that is rewritable and that is capable of retaining data even when not supplied with electric power, and an interface unit 21e that controls each unit, such as the communication unit 23, connected to the controller 21.

The nonvolatile memory 21d is constituted of, for example, a SRAM or a flash memory backed up by a battery, and stores, for example, a document data file and setting information. The controller 21 reads a program stored in the secondary storage unit 22, so that each process of the terminal apparatus 30 according to this exemplary embodiment is executed.

The secondary storage unit 22 is constituted of, for example, a hard disk drive (HDD) or a semiconductor memory. The secondary storage unit 22 varies depending on the product type of the terminal apparatus 30 or the management server 50. The secondary storage unit 22 stores, for example, document data to be printed. Additionally, for example, a program to be executed by the controller 21, a print job, user information, and association information are stored in the secondary storage unit 22.

Moreover, the terminal apparatus 30 includes an input device, such as a keyboard and a mouse, and the display 35 (not shown in FIG. 5) constituted of a liquid crystal display. If the input device is a touchscreen, the input device may be integrated with the display 35.

The controller 21, the secondary storage unit 22, and the communication unit 23 are connected to one another via a bus or a signal line.

The terminal apparatus 30 receives a user command based on an operation performed by the user via the input device. Examples of the user command include a command for causing the display 35 to display a document and a command for causing any of the image forming apparatuses 10 to print the document.

The terminal apparatus 30 also generates a print job for the document corresponding to the printing command given by the user. As mentioned above, a print job is constituted of a data file and setting information.

The terminal apparatus 30 transmits the generated print job to a designated destination. In this exemplary embodiment, the final destination for the generated print job is set to any of the image forming apparatuses 10 (see FIG. 1). For example, the terminal apparatus 30 transmits the print job to the image forming apparatus 10 (see FIG. 1) via the management server 50 (see FIG. 1). Alternatively, the terminal apparatus 30 may transmit the print job to the image forming apparatus 10 (see FIG. 1) without the intervention of the management server 50 (see FIG. 1).

Furthermore, the terminal apparatus 30 may acquire information transmitted from the communication controller 119 of the image forming apparatus 10.

The management server 50 acquires a new print job and executes a process involving, for example, managing association information in response to a request from the terminal apparatus 30. Moreover, the management server 50 provides various types of information, such as the print job and the association information, to the image forming apparatus 10.

In this exemplary embodiment, the secondary storage unit 22 stores, for example, the print job, and the communication unit 23 receives, for example, a request from another apparatus and transmits, for example, the requested print job.

Flow of Process

FIG. 6 illustrates an example of a process in which an image forming apparatus 10a commands another image forming apparatus 10 to stop printing in a processing sequence according to the first exemplary embodiment.

It is assumed in this process that the user commands, from the terminal apparatus 30, multiple image forming apparatuses 10 to print documents.

The example in FIG. 6 corresponds to a case where the user who has given the command for printing multiple documents uses the terminal apparatus 30 to command the image forming apparatus 10a to stop printing a document that the image forming apparatus 10a is responsible for printing.

First, in step S1, the terminal apparatus 30 receives a command for printing multiple documents from the user. The command for printing the multiple documents may be received at once from the user or may be received separately from the user for each document.

In step S2, the terminal apparatus 30 transmits a print job generated for each document to the management server 50.

Subsequently, in step S3, the management server 50 transmits each of the received print jobs of the multiple documents to the corresponding image forming apparatus 10 that is responsible for printing. For example, the management server 50 transmits a print job for a document with a filename "report A" to the image forming apparatus 10a, a print job for a document with a filename "report B" to an image forming apparatus 10b, and a print job for a document with a filename "report C" to an image forming apparatus 10c.

The multiple image forming apparatuses 10 respectively retain the received print jobs.

The user moves to the location where the image forming apparatus 10a is installed, so as to operate the image forming apparatus 10a.

In step S4, the image forming apparatus 10a executes an authentication process on the user operating the image forming apparatus 10a. The image forming apparatus 10a authenticates the user operating the image forming apparatus 10a based on acquired user information. In other words, the image forming apparatus 10a identifies that the user who has successfully completed the authentication is the user operating the image forming apparatus 10a.

In step S5, the image forming apparatus 10a causes the display 18 to display information about the print job for the document corresponding to the printing command given by the authenticated user. In other words, the image forming apparatus 10a causes the display 18 to display the information about the print job registered in the terminal apparatus 30 by the authenticated user.

In this exemplary embodiment, when the authenticated user selects a mode (referred to as "linkage output mode" hereinafter) for displaying information about print jobs registered in other image forming apparatuses 10, the image forming apparatus 10a acquires the information about the print jobs registered in the other image forming apparatuses 10 from the management server 50. The image forming apparatus 10a displays information about print jobs that are registered by the user who has successfully completed the authentication at the image forming apparatus 10a and that are retained in the image forming apparatuses 10a, 10b, and 10c.

A screen of each image forming apparatus 10 used for displaying the information about the print jobs registered by the authenticated user will now be described.

Figure 7A:
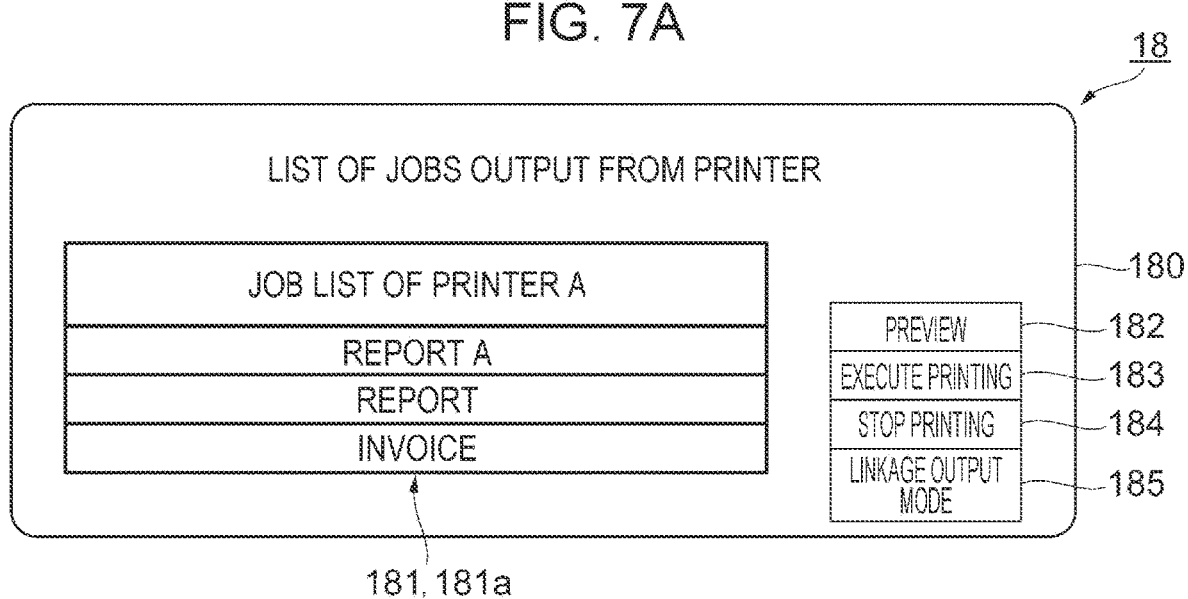
FIGS. 7A and 7B illustrate examples of a screen used for displaying information about print jobs, FIG. 7A illustrating an example of the screen indicating print jobs retained in the image forming apparatus, FIG. 7B illustrating an example of the screen indicating print jobs retained in other image forming apparatuses.
Figure 7B:
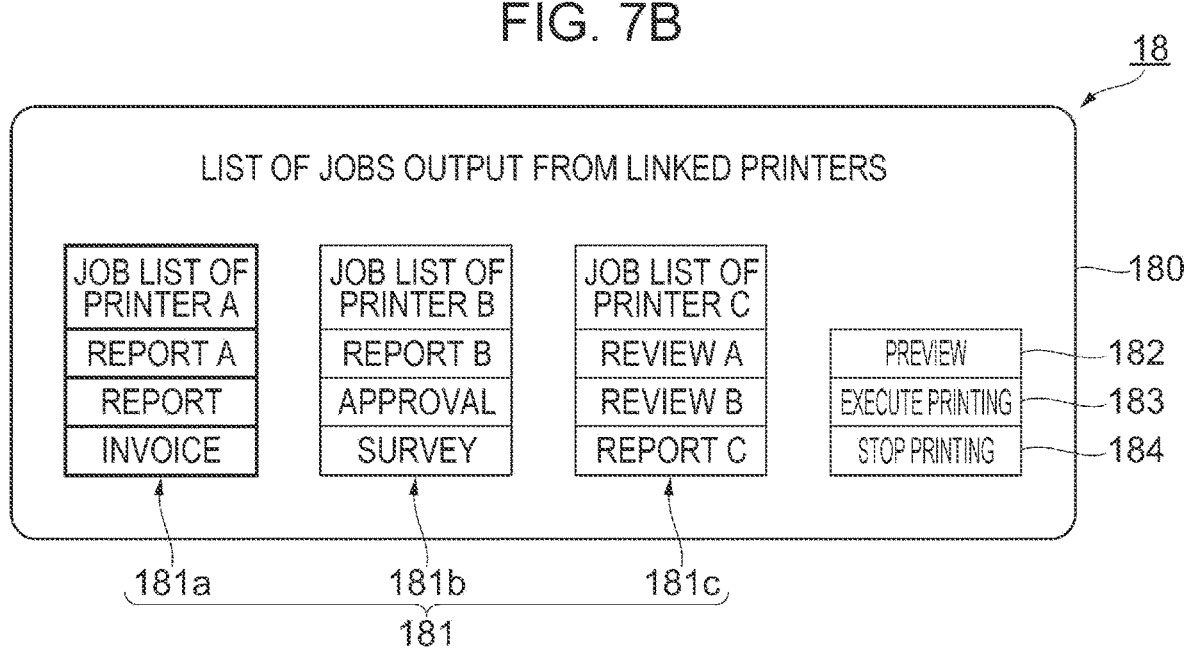

FIGS. 7A and 7B illustrate examples of the screen used for displaying the information about the print jobs. Specifically, FIG. 7A illustrates an example of the screen indicating print jobs retained in the image forming apparatus 10, and FIG. 7B illustrates an example of the screen indicating print jobs retained in the other image forming apparatuses 10.

In the display example shown in FIG. 7A, the display 18 of the image forming apparatus 10a having an image-forming-apparatus name "printer A" displays an operation screen 180 that includes a job list 181 (181a) displaying information about print jobs retained in the image forming apparatus 10a and registered by the authenticated user.

An example of the information about the print jobs displayed in the job list 181 includes filenames of documents corresponding to the print jobs retained in the image forming apparatus 10a. Other examples of the information about the print jobs include the sheet size and the number of copies of the printed material.

The operation screen 180 is a screen for displaying print jobs retained in each image forming apparatus 10.

The operation screen 180 further displays a preview button image 182 for receiving a command for displaying a preview image from the user, an execute printing button image 183 for receiving a command for executing printing from the user, and a stop printing button image 184 for receiving a command for stopping printing from the user.

In the display example shown in FIG. 7A, the operation screen 180 may further display a linkage-output button image 185 that receives, from the user, selection of the linkage output mode for displaying information about print jobs registered by the user and retained in the other image forming apparatuses 10 different from the image forming apparatus 10a.

When the user selects the linkage-output button image 185, the operation screen 180 transitions to the state shown in FIG. 7B.

In the display example shown in FIG. 7B, job lists 181 (181a, 181b, and 181c) displaying the print jobs registered by the authenticated user and retained in the image forming apparatuses 10a, 10b, and 10c are displayed. In FIG. 7B, the operation screen 180 is a linkage-output job list screen for displaying lists of print jobs registered in the respective image forming apparatuses 10 by the authenticated user. More specifically, the linkage-output job list screen displays the information about the print jobs retained in the respective image forming apparatuses 10.

The job list 181a displays, as the information about the print jobs, filenames "report A", "report", and "invoice" of documents corresponding to the print jobs retained in the image forming apparatus 10a.

The job list 181b displays, as the information about the print jobs, filenames "report B", "approval", and "survey" of documents corresponding to the print jobs retained in the image forming apparatus 10b having an image-forming-apparatus name "printer B".

The job list 181c displays, as the information about the print jobs, filenames "review A", "review B", and "report C" of documents corresponding to the print jobs retained in the image forming apparatus 10c having an image-forming-apparatus name "printer C".

In the following description, the filenames of the documents corresponding to the respective print jobs will be used when differentiating the print jobs from each other.

The display mode for the job lists 181 is varied between the job list 181a corresponding to the image forming apparatus 10a and the job lists 181 corresponding to the other image forming apparatuses 10. For example, the job list 181a corresponding to the image forming apparatus 10a is newly displayed with a frame along the outer edges of the display region or is given a different color, so as to be differentiated from the job lists 181 corresponding to the other image forming apparatuses 10.

In this exemplary embodiment, when the user selects the linkage-output button image 185 (see FIG. 7A), the linkage-output job list screen shown in FIG. 7B is displayed. Alternatively, the linkage-output job list screen may be displayed when the user who has registered the print jobs in the respective image forming apparatuses 10 is authenticated. In this case, the image forming apparatus 10a operated by the user acquires, from the management server 50, the information about the print jobs registered in the other image forming apparatuses 10 when the user is successfully authenticated.

For example, when the user who has registered the print jobs in the respective image forming apparatuses 10 is authenticated, the linkage-output job list screen may be displayed without the user selecting the linkage-output button image 185.

Alternatively, the linkage-output job list screen may be displayed when the user who has registered the print jobs in the respective image forming apparatuses 10 selects the stop printing button image 184 (see FIG. 7A).

In step S6, the image forming apparatus 10a receives, from the user, a command for stopping printing of the stoppage-target document that the image forming apparatus 10a is responsible for printing. In other words, the image forming apparatus 10a receives, from the user, a command for stopping the stoppage-target job retained in the image forming apparatus 10a.

More specifically, the image forming apparatus 10a receives, from the user, a command for stopping printing of the document that the image forming apparatus 10a is responsible for printing via the operation screen 180 displaying the linkage-output job list screen shown in FIG. 7B.

The screen of each image forming apparatus 10 for receiving a printing stoppage command given by the user will now be described.

Figure 8:
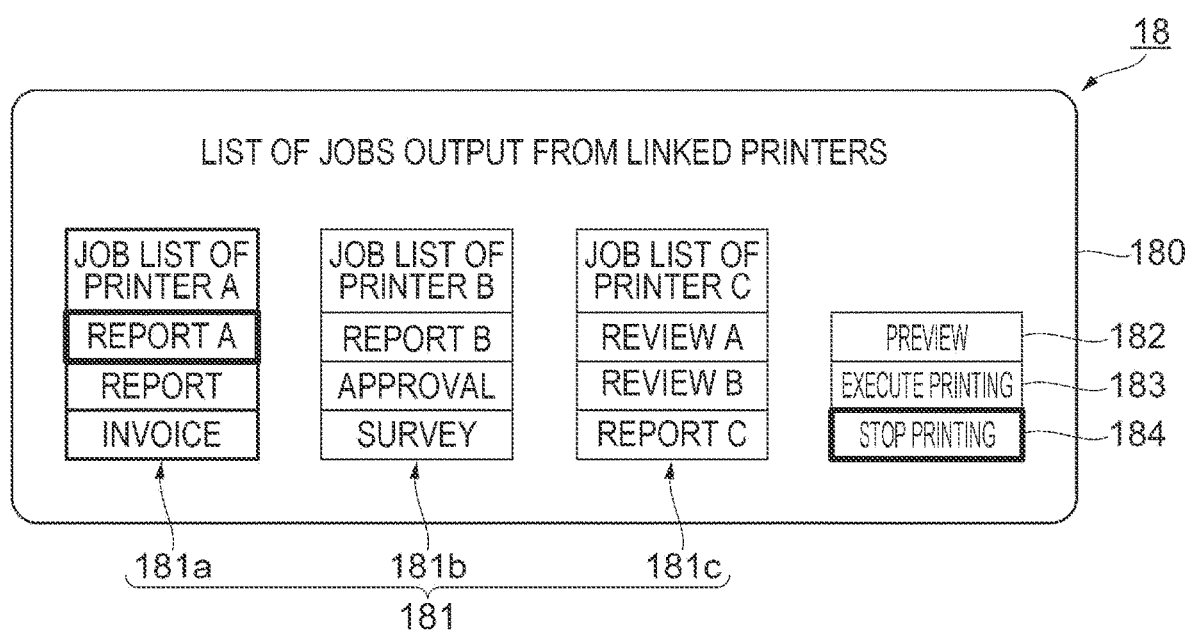
FIG. 8 illustrates an example of a screen that receives a printing stoppage command.

FIG. 8 illustrates an example of the screen that receives the printing stoppage command. In FIG. 8, the operation screen 180 is a screen that receives a user operation for giving a command for executing or stopping printing of a document corresponding to a print job that the image forming apparatus 10a is responsible for printing.

In the display example shown in FIG. 8, the user has selected "report A" indicated in the job list 181a and has further selected the stop printing button image 184. More specifically, in the display example shown in FIG. 8, the user has given a command for stopping the print job "report A" among the print jobs retained in the image forming apparatus 10a and indicated in the job list 181a.

When "report A" indicated in the job list 181a and the stop printing button image 184 are selected by the user, the image forming apparatus 10a stops printing the document, as a stoppage-target document, having the filename "report A" that the image forming apparatus 10a is responsible for printing.

Subsequently, in step S7, the image forming apparatus 10a stops printing the stoppage-target document corresponding to the printing stoppage command. If the stoppage-target document is undergoing printing when the printing stoppage command is received, the image forming apparatus 10a stops printing the stoppage-target document at a halfway point. If printing of the stoppage-target document has not yet started when the printing stoppage command is received, the image forming apparatus 10a keeps the printing process for the stoppage-target document in a pending mode.

Although not mentioned above, in this exemplary embodiment, information about the cause of the stoppage of printing of the stoppage-target document may be requested to the user. For example, candidates for the cause of the stoppage of printing may be presented in the image forming apparatus 10a, and the user may select the cause of the stoppage of printing of the stoppage-target document from the candidates for the cause of the stoppage of printing.

Alternatively, for example, the user may input text information to the image forming apparatus 10a to provide information for identifying text that corresponds to incompleteness in the stoppage-target document.

In step S8, the image forming apparatus 10a identifies a related print job related to the stoppage-target job. In other words, the image forming apparatus 10a identifies a related document related to the stoppage-target document for which printing has been stopped.

The image forming apparatus 10a identifies a print job satisfying the predetermined condition as a related print job and identifies a print job not satisfying the predetermined condition as a non-related print job.

In addition to print jobs that the image forming apparatus 10a is responsible for printing, the image forming apparatus 10a acquires, from the management server 50, information about printing jobs that the other image forming apparatuses 10 are responsible for printing. A related print job includes not only a print job that the image forming apparatus 10a is responsible for printing but also a print job that another image forming apparatus 10 is responsible for printing.

A screen of each image forming apparatus 10 used for displaying related-print-job information will now be described.

Figure 9A:
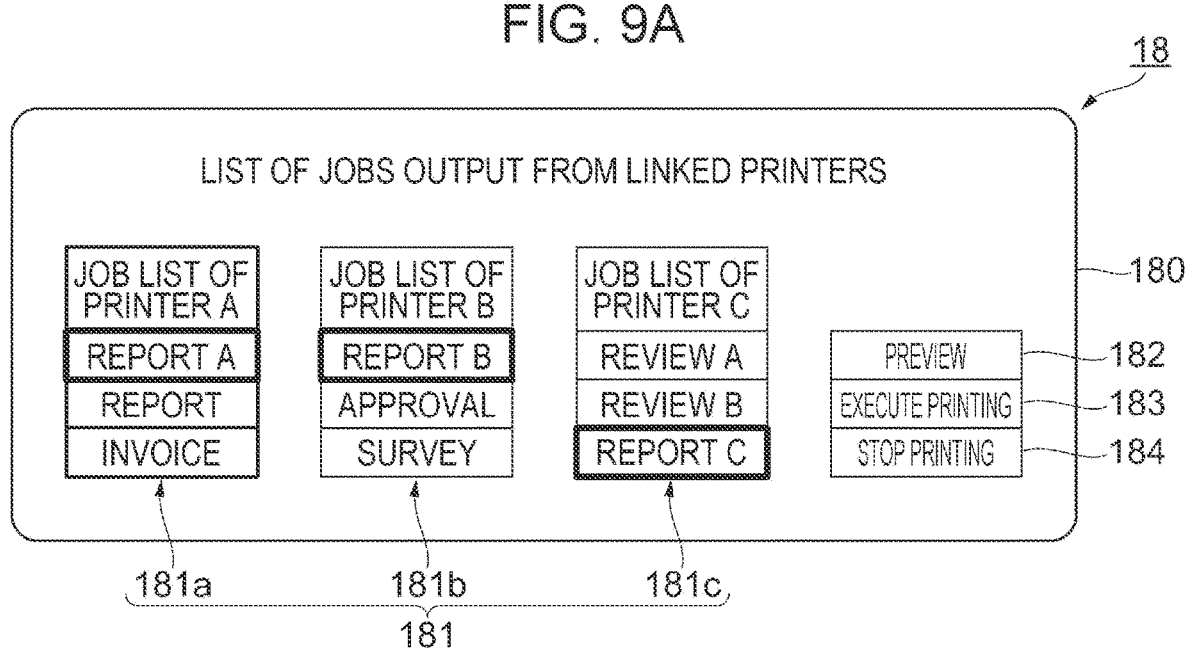
FIGS. 9A and 9B illustrate examples of a screen used for displaying related-print-job information, FIG. 9A illustrating an example of the screen indicating related print jobs, FIG. 9B illustrating an example of the screen used for displaying a preview image of a related document.
Figure 9B:
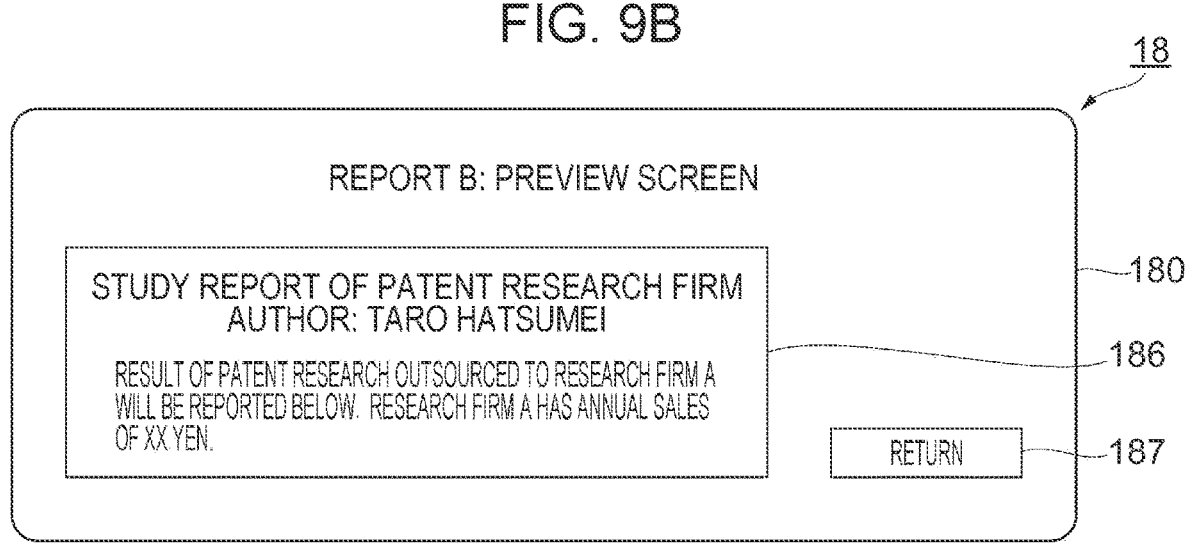

FIGS. 9A and 9B illustrate examples of the screen used for displaying the related-print-job information.

Specifically, FIG. 9A illustrates an example of the screen indicating related print jobs, and FIG. 9B illustrates an example of the screen used for displaying a preview image of a related document.

In the display example shown in FIG. 9A, "report B" indicated in the job list 181b and "report C" indicated in the job list 181c are identified as related print jobs related to the stoppage-target job "report A" corresponding to the printing stoppage command given by the user in FIG. 8.

The filenames of the documents corresponding to the print jobs "report B" and "report C" partially match the filename of the stoppage-target document corresponding to the stoppage-target job "report A". Furthermore, if each of the print jobs "report A", "report B", and "report C" is, for example, a print job generated by splitting a single document, the document data files of the print jobs "report B" and "report C" are related to the document data file of the stoppage-target job "report A".

It is assumed that the print job "report" indicated in the job list 181a and the stoppage-target job "report A" have partially matching filenames but have non-related document data files. The print job "report" is a non-related print job of the stoppage-target job "report A" and is not identified as a related print job.

The display mode for the print-job information displayed in the job list 181 is varied between a related print job and a non-related print job. A related print job is newly displayed with a frame along the outer edges of the display region, is given a different color, or is displayed in a blinking mode, so as to be displayed in a highlighted fashion as compared with a non-related print job.

When a print job indicated in the job list 181 and the preview button image 182 shown in FIG. 9A are selected, the image forming apparatus 10a receives, from the user, a command for displaying a preview image corresponding to the selected print job.

In the example shown in FIG. 9B, the display 18 of the image forming apparatus 10a displays the operation screen 180 including a preview image 186 corresponding to the selected print job and a return button image 187 for receiving a command for returning the screen to the screen prior to the displaying of the preview image 186.

More specifically, if the user selects the related print job "report B" indicated in the job list 181b shown in FIG. 9A and the preview button image 182, the preview image 186 indicating the contents of the related document corresponding to the related print job "report B" is displayed, as shown in FIG. 9B.

As an alternative to the display example in FIG. 9B in which the document corresponding to the displayed preview image 186 is a related document corresponding to a related print job, the document may be any document corresponding to a print job selectable on the operation screen 180 by the user.

Subsequently, in step 39, the image forming apparatus 10a identifies a related stoppage job to be stopped in relation to the stoppage of the stoppage-target job from the related print jobs.

More specifically, the image forming apparatus 10a determines whether or not printing of a related document is to be stopped, and identifies a related stoppage job to be stopped in relation to the stoppage of the stoppage-target job. For example, if the cause of the stoppage of printing of the stoppage-target document does not affect printing of the related document, the image forming apparatus 10a does not stop printing the related document, whereas if the cause of the stoppage of printing of the stoppage-target document affects printing of the related document, the image forming apparatus 10a stops printing the related document.

In this exemplary embodiment, for example, if printing of the related document corresponding to the related print job "report C" related to the stoppage-target job "report A" shown in FIG. 9A is not affected, the related print job "report C" is not identified as a related stoppage job. In contrast, for example, if printing of the related document corresponding to the related print job "report B" related to the stoppage-target job "report A" is affected, the related print job "report B" is identified as a related stoppage job.

In step S10, the image forming apparatus 10a commands a second image forming apparatus 10 retaining the related stoppage job to stop printing the related document corresponding to this related stoppage job. For example, the image forming apparatus 10a commands the image forming apparatus 10b to stop printing the related document corresponding to the related stoppage job "report B" shown in FIG. 9A. On other hand, the image forming apparatus 10a does not give a command for stopping printing of the related document corresponding to the related print job "report C" not identified as a related stoppage job.

The second image forming apparatus 10 stops printing the related document corresponding to the related stoppage job based on the printing stoppage command from the image forming apparatus 10a. In the example shown in FIG. 9A, the image forming apparatus 10b receives the command for stopping the related stoppage job "report B" and stops printing the related document having the filename "report B". On the other hand, the image forming apparatus 10c does not receive a command for stopping the related print job "report C" and thus does not stop printing the related document having the filename "report C".

In the processing example described above, each image forming apparatus 10 identifies a related document that may be affected by the cause of the stoppage of printing of the stoppage-target document from the related documents, and gives a command for stopping printing of this identified related document. As an alternative to this processing example, a print job selected by the user may be identified as a related stoppage job from the print jobs presented on the operation screen 180, and a command may be given for stopping printing of the document corresponding to this identified related stoppage job.

The image forming apparatus 10 may give a printing stoppage command for all related documents corresponding to related print jobs. More specifically, if there are multiple related documents, the image forming apparatus 10 may give a command for stopping printing of related documents for all the related documents.

The process to be executed by the image forming apparatus 10a according to the first exemplary embodiment is not limited to that described above. In addition to stopping printing of a document corresponding to a print job retained in each image forming apparatus 10, the print job may be deleted.

In this case, when the print job is to be deleted, a related print job related to the print job corresponding to the deletion command given by the user is also to be deleted.

In this case, in this exemplary embodiment, the print job is classified into a print job (referred to as "deletion-target job" hereinafter) for which the user has given a deletion command and a print job (referred to as "non-deletion-target job" hereinafter) for which the user has not given a deletion command. In other words, the document for which the image forming apparatus 10 retains print-job-related information is classified into a document (referred to as "deletion-target document" hereinafter) corresponding to the deletion-target job and a document (referred to as "non-deletion-target document" hereinafter) corresponding to the non-deletion-target job.

The deletion-target document as an example of a first document is a document for which the user has given a print-job deletion command among documents that the image forming apparatus 10 operated by the user is responsible for printing.

The non-deletion-target job is classified into a related print job related to the deletion-target job and a non-related print job not related to the deletion-target job. In other words, the non-deletion-target document is classified into a related document and a non-related document.

The related document as an example of a second document is a document related to the deletion-target document. On the other hand, the non-related document is a document not related to the deletion-target document.

Furthermore, the related print job is classified into a related print job (referred to as "related deletion job" hereinafter) to be deleted in relation to the deletion-target job and a related print job (referred to as "related non-deletion job" hereinafter) not to be deleted in relation to the deletion-target job.

The following description relates to a processing example where the image forming apparatus 10a commands another image forming apparatus 10 to delete a related print job.

FIG. 10 is a flowchart illustrating the flow of a process in which the image forming apparatus 10a according to the first exemplary embodiment commands another image forming apparatus 10 to delete a related print job.

First, in step S11, the image forming apparatus 10a receives, from the user, a deletion-target document that the image forming apparatus 10a is responsible for printing. In other words, the image forming apparatus 10a receives, from the user, a deletion-target document retained in the image forming apparatus 10a.

In step S12, the image forming apparatus 10a identifies a related print job related to the deletion-target job corresponding to the received deletion command. In other words, the image forming apparatus 10a identifies a related document related to the deletion-target document for which the user has given the print-job deletion command.

The following description relates to a screen of the image forming apparatus 10a for receiving, from the user, selection of a print job or jobs to be deleted.

Figure 11A:
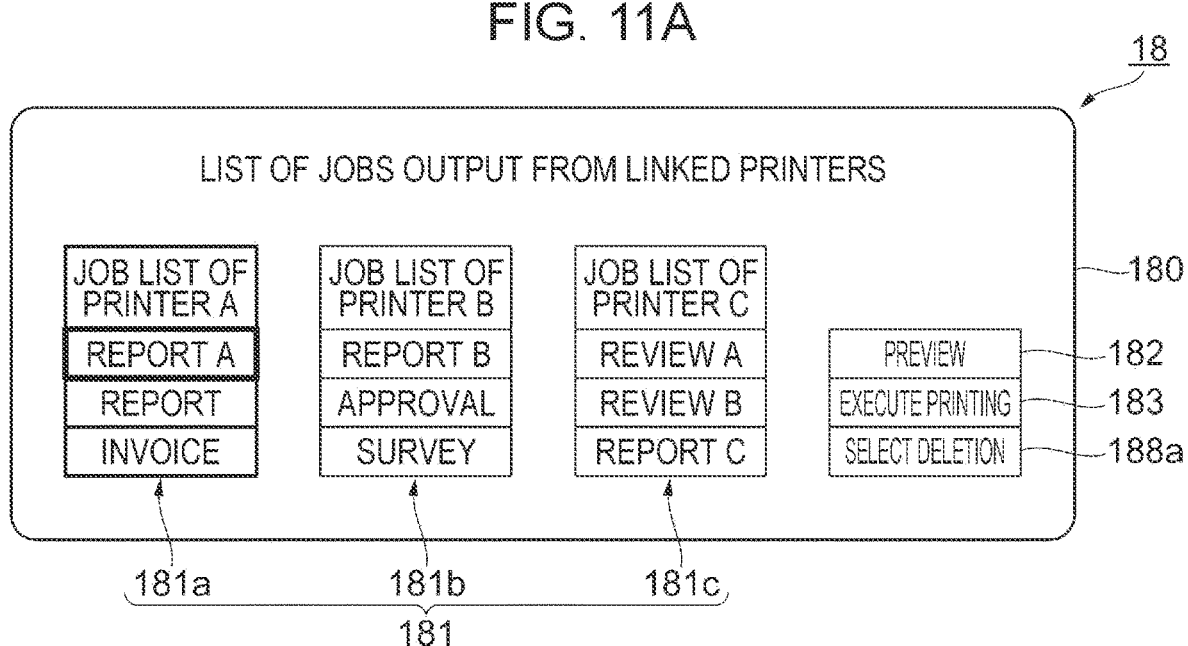
FIGS. 11A and 11B illustrate examples of a screen that receives a print-job deletion command from the user, FIG. 11A illustrating an example of the screen that receives a deletion-target job, FIG. 11B illustrating an example of the screen indicating related print jobs.
Figure 11B:
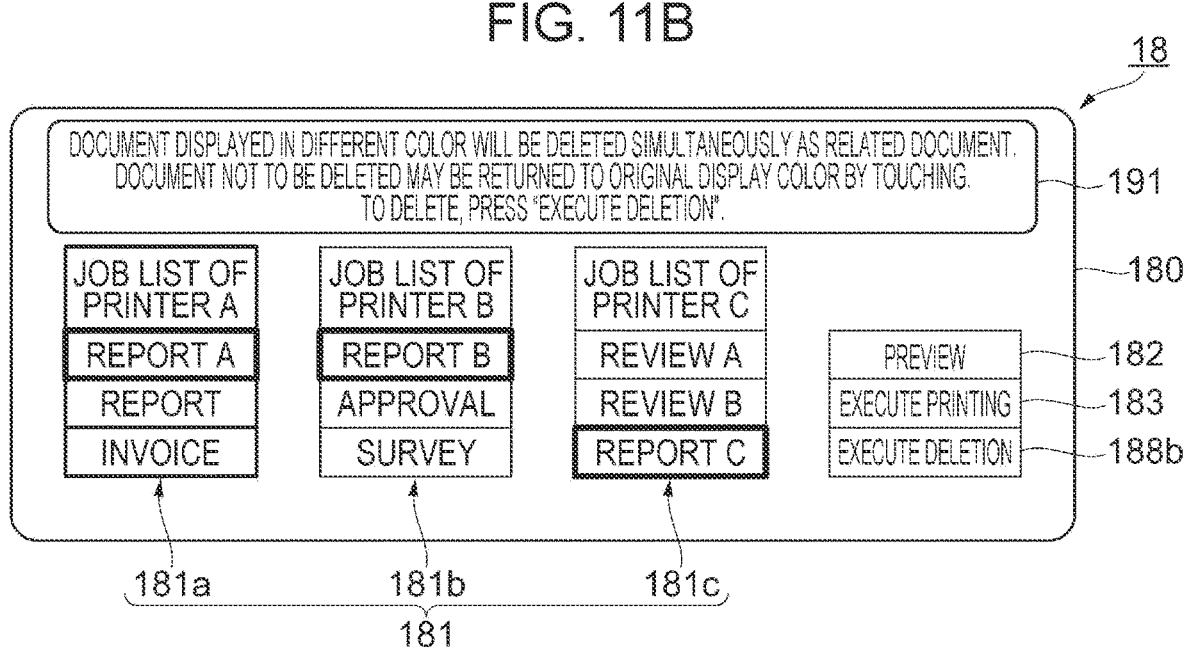

FIGS. 11A and 11B illustrate examples of the screen that receives a print-job deletion command from the user. Specifically, FIG. 11A illustrates an example of the screen that receives a deletion-target job, and FIG. 11B illustrates an example of the screen indicating related print jobs.

In the display example shown in FIG. 11A, the display 18 of the image forming apparatus 10a displays the operation screen 180 including a select deletion button image 188a for receiving a command for deleting a deletion-target job from the user in place of the stop printing button image 184 shown in FIG. 8. Alternatively, the select deletion button image 188a may be displayed together with the stop printing button image 184.

In the display example shown in FIG. 11A, the user has selected "report A" indicated in the job list 181a and has selected the select deletion button image 188a. More specifically, in the display example shown in FIG. 11A, the user has given a command for deleting the print job "report A" among the print jobs retained in the image forming apparatus 10a and indicated in the job list 181a.

When "report A" indicated in the job list 181a and the select deletion button image 188a are selected by the user, the image forming apparatus 10a receives, from the user, a command for deleting the print job of the document, as a deletion-target document, having the filename "report A" that the image forming apparatus 10a is responsible for printing.

When any of the print jobs indicated in the job list 181 and the select deletion button image 188a shown in FIG. 11A are selected, a result indicating that related print jobs related to the print job selected by the user have been identified is displayed.

More specifically, as shown in FIG. 11B, the display mode is varied for "report B" indicated in the job list 181b and identified as a related print job related to the deletion-target job "report A" corresponding to the deletion command given by the user in FIG. 11A and "report C" indicated in the job list 181c.

In the display example shown in FIG. 11B, the operation screen 180 displays an execute deletion button image 188b for receiving, from the user, a command for executing deletion of the deletion-target job selected by the user and the related print jobs related to this deletion-target job.

Furthermore, in the display example shown in FIG. 11B, the deletion of the print jobs based on the display transition from the operation screen 180 shown in FIG. 11A and the selection of the execute deletion button image 188b is displayed as indicated by reference sign 191. As an alternative to the example indicated by reference sign 191 in which a text message is displayed, a picture or a symbol may be displayed.

Subsequently, in step S13, the image forming apparatus 10a receives, from the user, selection of a related deletion job to be deleted in relation to the deletion-target job from the identified related print jobs. In other words, the image forming apparatus 10a identifies a related deletion job to be deleted in relation to the deletion-target job from the related print jobs.

In step S14, the image forming apparatus 10a receives, from the user, a command for executing deletion of the deletion-target job selected by the user and the related deletion job.

The following description relates to a screen of the image forming apparatus 10a for receiving, from the user, a command for executing deletion of print jobs.

Figure 12A:
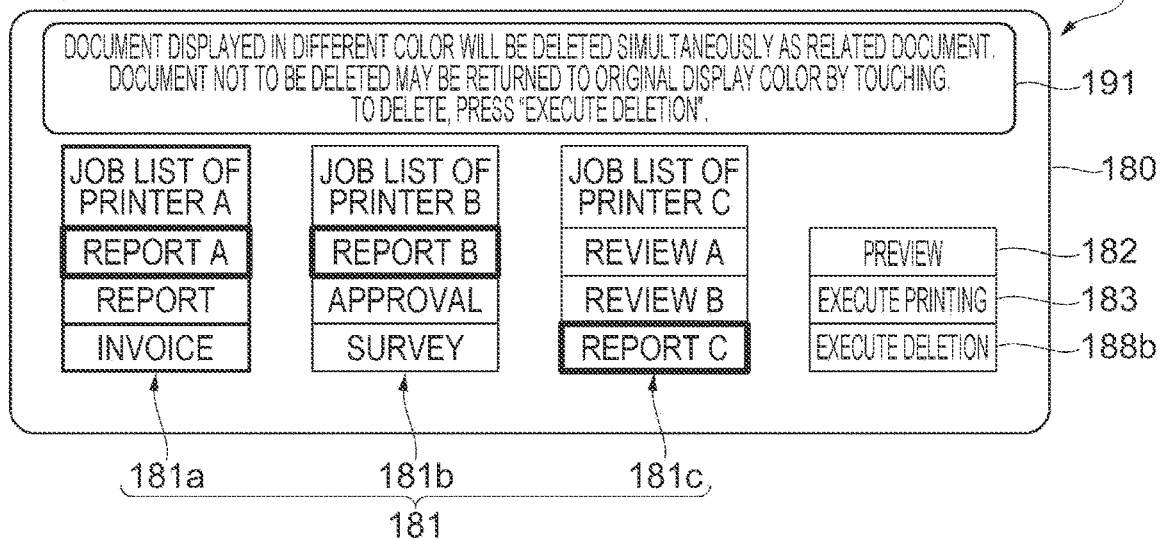
FIGS. 12A to 12C illustrate examples of a screen that receives, from the user, a command for executing deletion of print jobs, FIG. 12A illustrating a state before a related deletion job is selected, FIG. 12B illustrating a state after the related deletion job is selected and before an execute deletion button image is selected, FIG. 12C illustrating a state after the execute deletion button image is selected.
Figure 12B:
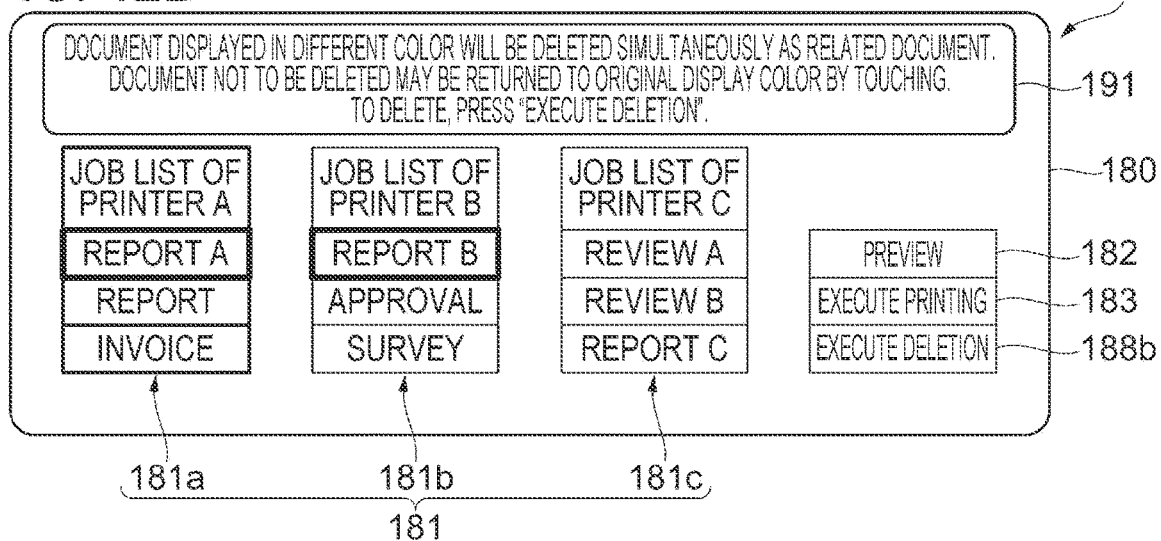
Figure 12C:
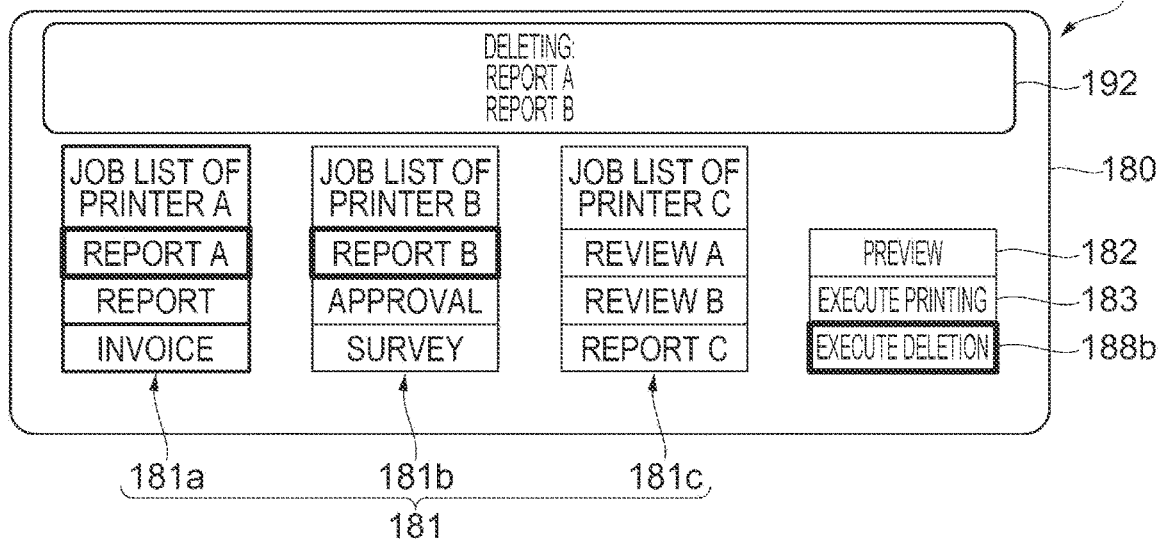

FIGS. 12A to 12C illustrate examples of the screen that receives, from the user, a command for executing deletion of print jobs. Specifically, FIG. 12A illustrates a state before a related deletion job is selected, FIG. 12B illustrates a state after the related deletion job is selected and before the execute deletion button image 188b is selected, and FIG. 12C illustrates a state after the execute deletion button image 188b is selected.

In the display example shown in FIG. 12A, the display mode for the related print jobs "report B" and "report C" related to the deletion-target job "report A" is varied from the display mode for the other print jobs.

In the display example shown in FIG. 12A, selection of a related print job to be deleted as a related deletion job from the identified related print jobs is received from the user via the operation screen 180.

In the display example shown in FIG. 12B, the user has selected the related print job "report B" as a related deletion job from the identified related print jobs. On the other hand, the related print job "report C" has not been selected from the identified related print jobs.

For example, the user may switch the related deletion job by selecting the filename of a document corresponding to each print job displayed in the job list 181.

In the display example shown in FIG. 12C, "report B" as a related deletion job and the execute deletion button image 188b have been selected. In this state, the image forming apparatus 10a receives, from the user, a command for executing deletion of the deletion-target job "report A" and the related deletion job "report B".

Furthermore, in the display example shown in FIG. 12C, the deletion-target job "report A" and the related deletion job "report B" are displayed as indicated by reference sign 192. More specifically, in the display example shown in FIG. 12C, the progress of deletion of the deletion-target job "report A" and the related deletion job "report B" is displayed as indicated by reference sign 192. As an alternative to the example indicated by reference sign 192 in which a text message is displayed, a picture or a symbol may be displayed.

Subsequently, in step S15, the image forming apparatus 10a determines whether or not the related deletion job corresponding to the deletion execution command given by the user is retained in the image forming apparatus 10a.

If the related deletion job is retained in the image forming apparatus 10a (YES in step S15), the image forming apparatus 10a deletes the related deletion job together with the deletion-target job in step S16. In other words, the image forming apparatus 10a is not to retain the deletion-target job and the related deletion job.

If the related deletion job corresponding to the deletion execution command given by the user is not retained in the image forming apparatus 10a in step S15 (NO in step S15), the image forming apparatus 10a deletes the deletion-target job and commands another image forming apparatus 10 retaining the related deletion job to delete this related deletion job in step S17.

As shown in FIG. 12C, when the image forming apparatus 10a receives a command for executing deletion of the deletion-target job "report A" and the related deletion job "report B" from the user, the image forming apparatus 10a commands the image forming apparatus 10b to delete the related deletion job "report B". Based on this deletion command, the image forming apparatus 10b deletes the related deletion job "report B".

The content of the command given to another image forming apparatus 10 by the image forming apparatus 10a according to the first exemplary embodiment is not limited to a stoppage of printing or deletion of a print job, and may include a command for executing printing.

In this case, when printing is to be executed, printing is also executed for a related print job related to the print job corresponding to the printing stoppage command given by the user. The following description relates to a processing example where the image forming apparatus 10a commands another image forming apparatus 10 to execute printing of a related document.

FIG. 13 illustrates an example of a process in which the image forming apparatus 10a commands another image forming apparatus 10 to execute printing in a processing sequence according to the first exemplary embodiment.

It is assumed in this process that the multiple image forming apparatuses 10 each retain a print job corresponding to a document for which the user has given a printing command via the terminal apparatus 30.

FIG. 13 is an example where, in a state where the user operating the image forming apparatus 10a is authenticated as a user who has given the command for printing multiple documents via the terminal apparatus 30, the user gives a command for pausing printing of a document that the image forming apparatus 10a is responsible for printing.

First, in step S21, the image forming apparatus 10a receives, from the user, a command for pausing printing of a stoppage-target document that the image forming apparatus 10a is responsible for printing.

In step S2, the image forming apparatus 10a pauses printing of the stoppage-target document corresponding to the received printing pause command.

In step S23, the image forming apparatus 10a commands a second image forming apparatus 10 retaining a related stoppage job to pause printing of a related document corresponding to the related stoppage job. The related document corresponding to the related stoppage job in this processing example is, for example, a related document that is related to the stoppage-target document corresponding to the received printing pause command and that is affected by the pause in printing of the stoppage-target document.

Based on the printing pause command from the image forming apparatus 10a, the second image forming apparatus 10 pauses printing of the related document corresponding to the related stoppage job retained therein.

The following description relates to a screen of the image forming apparatus 10a that receives, from the user, selection of a print job for which printing is to be paused.

Figure 14A:
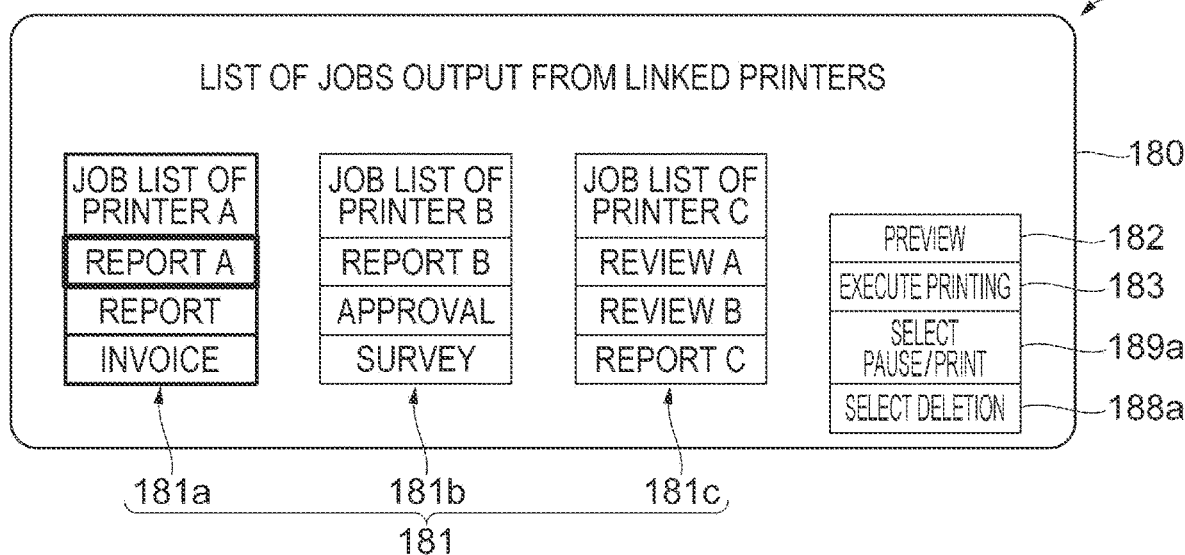
FIGS. 14A and 14B illustrate examples of a screen that receives, from the user, a command for pausing printing, FIG. 14A illustrating an example of the screen that receives a pause command with respect to a stoppage-target document, FIG. 14B illustrating an example of the screen indicating related stoppage jobs that have been paused.
Figure 14B:
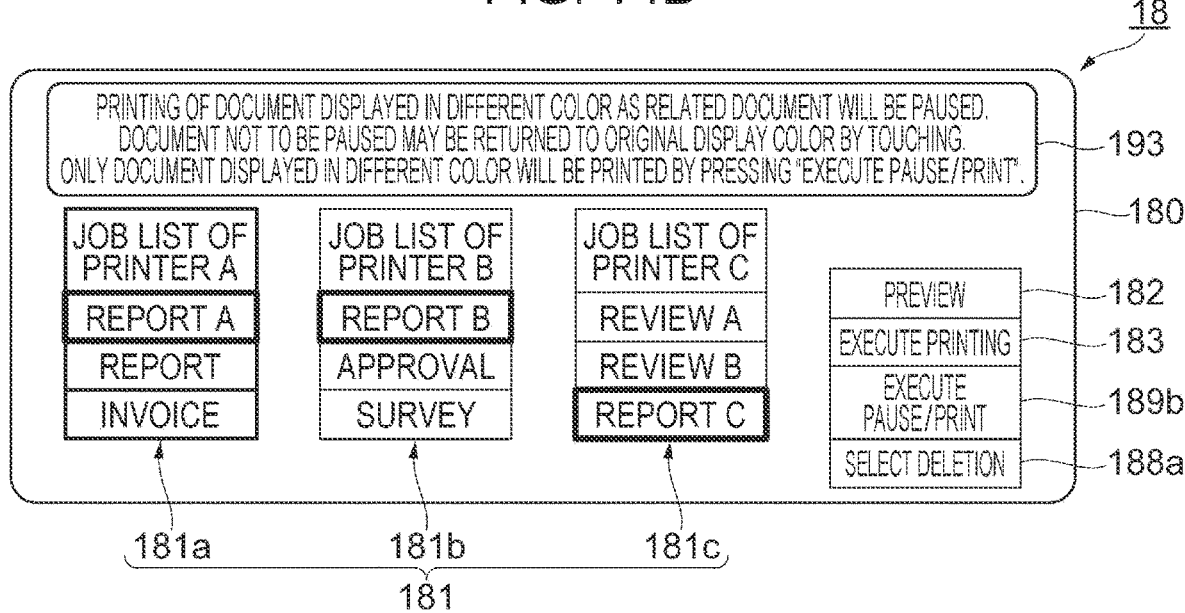

FIGS. 14A and 14B illustrate examples of the screen that receives, from the user, a command for pausing printing. Specifically, FIG. 14A illustrates an example of the screen that receives a pause command for a stoppage-target document, and FIG. 14B illustrates an example of the screen indicating related stoppage jobs that have been paused.

In the display example shown in FIG. 14A, the display 18 of the image forming apparatus 10a displays a select pause/print button image 189a that receives, from the user, selection of a print job whose information is acquired by the image forming apparatus 10a and that is to be paused or executed.

In the display example shown in FIG. 14A, information about print jobs that the image forming apparatus 10a is responsible for printing is displayed in the job list 181a, and information about print jobs retained by the other image forming apparatuses 10 is displayed in the job lists 181b and 181c.

In the display example shown in FIG. 14A, before the select pause/print button image 189a is selected, the user has selected "report A" indicated in the job list 181a. More specifically, in the display example shown in FIG. 14A, the user has selected the print job "report A" as a stoppage-target job to be paused from the print jobs indicated in the job list 181a and retained in the image forming apparatus 10a.

When "report A" indicated in the job list 181a and the select pause/print button image 189a are selected, the image forming apparatus 10a receives, from the user, a command for pausing printing of the document, as a stoppage-target document, having the filename "report A" that the image forming apparatus 10a is responsible for printing.

The number of print jobs to be selected as stoppage-target documents by the user is not limited to one, and multiple print jobs may be selected as stoppage-target documents.

When any of the print jobs indicated in the job list 181a and the select pause/print button image 189a shown in FIG. 14A are selected, each related stoppage job to be paused in relation to the stoppage-target job selected by the user is identified, and printing of a related document corresponding to this related stoppage job is also paused. When printing of the related document is to be paused, the operation screen 180 displays the related stoppage job of this paused related document.

In the display example shown in FIG. 14B, the stoppage-target job "report A" corresponding to the printing pause command given by the user is displayed in a display mode different from the display mode for the other print jobs. Furthermore, the display mode for "report B" in the job list 181b and "report C" in the job list 181c as related stoppage jobs related to the stoppage-target job is varied from the display mode for the remaining non-paused print jobs.

In the display example shown in FIG. 14B, the operation screen 180 displays an execute pause/print button image 189b that receives, from the user, a command for pausing or printing paused print jobs, such as the stoppage-target job and the related stoppage jobs.

Furthermore, in the display example shown in FIG. 14B, the execution of printing based on the display transition from the operation screen 180 shown in FIG. 14A and the selection of the execute pause/print button image 189b is displayed as indicated by reference sign 193. As an alternative to the example indicated by reference sign 193 in which a text message is displayed, a picture or a symbol may be displayed.

Subsequently, in step S24, the image forming apparatus 10a receives, from the user, selection of a related stoppage job corresponding to the printing execution command from the paused related stoppage jobs.

In step S25, the image forming apparatus 10a receives, from the user, a command for executing printing of the stoppage-target document and the related document.

In step S26, the image forming apparatus 10a executes printing of the stoppage-target document corresponding to the received printing execution command.

The following description relates to a screen of the image forming apparatus 10a that receives, from the user, a command for executing printing of a document corresponding to a paused print job.

Figure 15A:
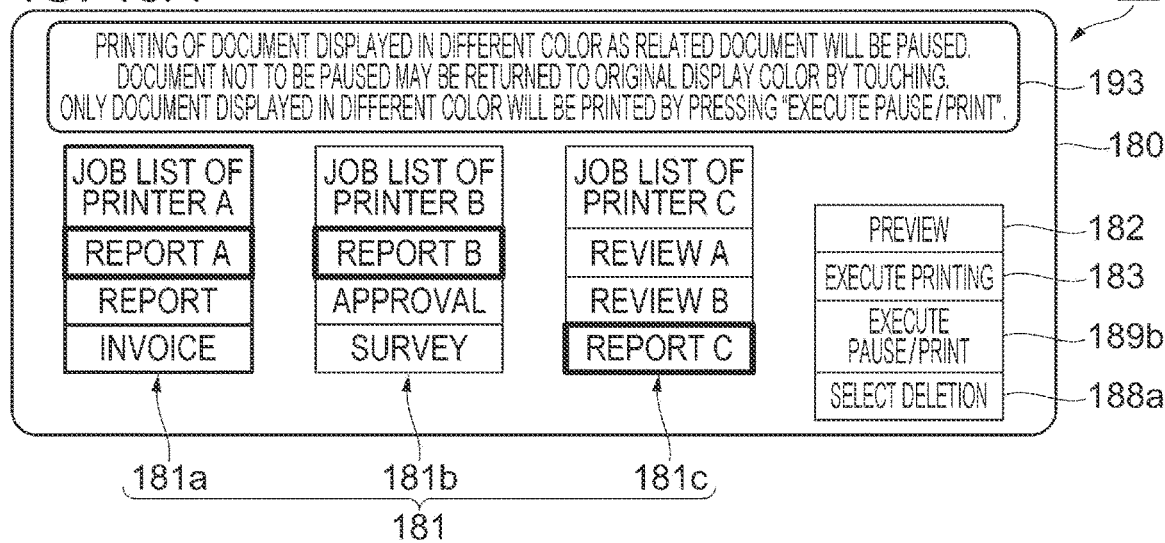
FIGS. 15A to 15C illustrate examples of a screen that receives, from the user, a command for executing printing of a document corresponding to a paused print job, FIG. 15A illustrating a state before a related stoppage job subjected to execution of printing is selected, FIG. 15B illustrating a state after the related stoppage job subjected to execution of printing is selected and before an execute pause/print button image is selected, FIG. 15C illustrating a state after the execute pause/print button image is selected.
Figure 15B:
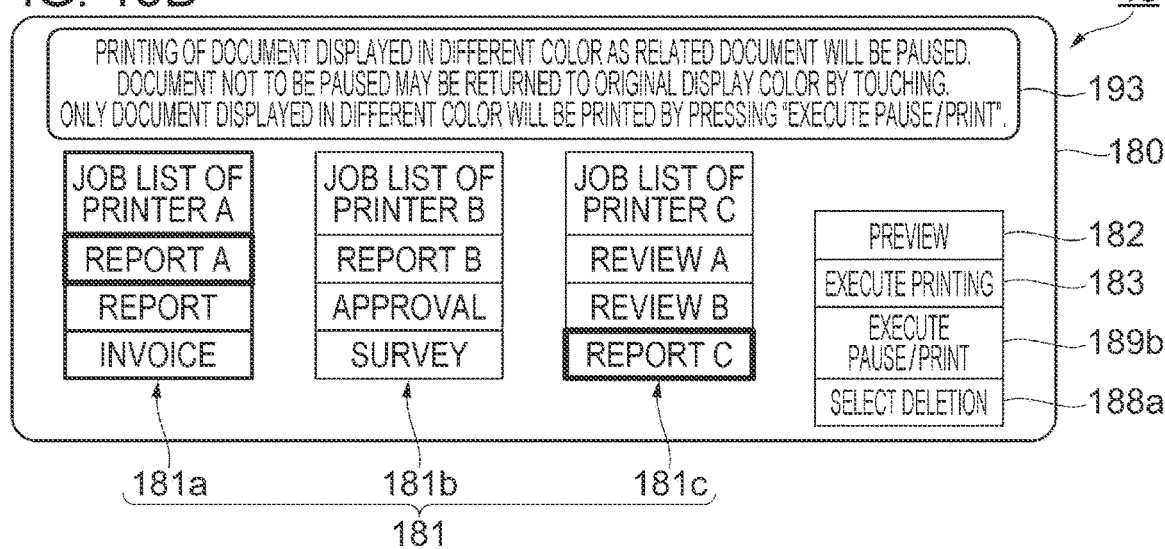
Figure 15C:
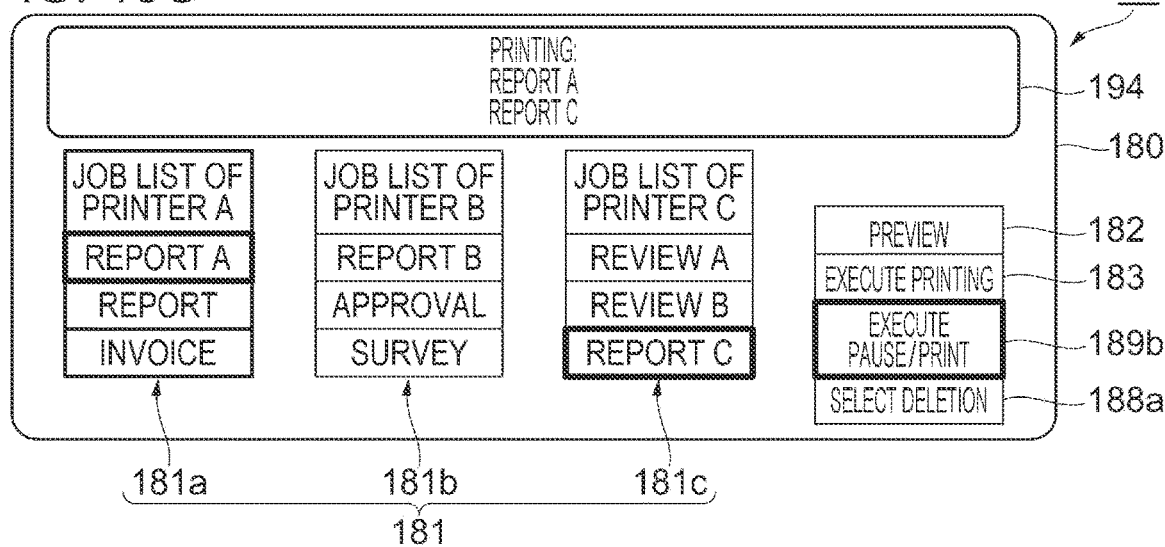

FIGS. 15A to 15C illustrate examples of the screen that receives, from the user, a command for executing printing of a document corresponding to a paused print job.

Specifically, FIG. 15A illustrates a state before a related stoppage job subjected to execution of printing is selected, FIG. 15B illustrates a state after the related stoppage job subjected to execution of printing is selected and before the execute pause/print button image 189b is selected, and FIG. 15C illustrates a state after the execute pause/print button image 189b is selected.

In the display example shown in FIG. 15A, the display mode for the related stoppage jobs "report B" and "report C" paused together with the stoppage-target job "report A" corresponding to the stoppage command given by the user is varied from the display mode for the other print jobs.

In the display example shown in FIG. 15A, the operation screen 180 receives, from the user, selection of a related stoppage job subjected to execution of printing from the paused related stoppage jobs.

In the display example shown in FIG. 15B, the user has selected the related stoppage job "report C", as a related stoppage job for which printing of a related document is to be executed, from the paused related stoppage jobs. On the other hand, the related stoppage job "report B" has not been selected from the paused related stoppage jobs.

For example, the user may switch the related stoppage job, for which printing of the related document is to be executed, by selecting the filename of a document corresponding to each print job displayed in the job list 181.

In the display example shown in FIG. 15C, the related stoppage job "report C" as a related stoppage job subjected to execution of printing and the execute pause/print button image 189b have been selected. In this state, the image forming apparatus 10a receives, from the user, a command for executing printing of the stoppage-target document corresponding to the stoppage-target job "report A" and the related document corresponding to the related stoppage job "report C".

Furthermore, in the display example shown in FIG. 15C, the stoppage-target job "report A" and the related stoppage job "report C" subjected to execution of printing based on the command from the user are displayed as indicated by reference sign 194. More specifically, in the display example shown in FIG. 15C, the progress of printing of the stoppage-target document corresponding to the stoppage-target job "report A" and the related document corresponding to the related stoppage job "report C" subjected to execution of printing based on the command from the user is displayed as indicated by reference sign 194. As an alternative to the example indicated by reference sign 194 in which a text message is displayed, a picture or a symbol may be displayed.

On the other hand, in the display example shown in FIG. 15C, the related stoppage job "report B" for which the user has not given a printing execution command is maintained in a paused state. More specifically, when the execute pause/print button image 189b is selected in a case where the related stoppage job "report B" is not selected as a related stoppage job subjected to execution of printing, the paused state of the related document corresponding to the related stoppage job "report B" is not to be cancelled.

In step S27, the image forming apparatus 10a commands a second image forming apparatus 10 retaining the related stoppage job selected by the user to execute printing of the related document corresponding to this related stoppage job.

Then, based on the printing execution command from the image forming apparatus 10a, the second image forming apparatus 10 executes printing of the related document corresponding to the related stoppage job retained therein.

Although not described above, in this exemplary embodiment, the second image forming apparatus 10 retaining a related stoppage job for which a printing execution command is not given among the paused related stoppage jobs may be given a command for maintaining the related document corresponding to the related stoppage job in the paused state.

Then, based on the command for maintaining the paused state from the image forming apparatus 10a, the second image forming apparatus 10 maintains the related document corresponding to the related stoppage job retained therein in the paused state.

Furthermore, in this exemplary embodiment, after the select pause/print button image 189a is selected, the image forming apparatus 10a may cancel the selected state of the stoppage-target job retained therein. In this case, the paused state of the stoppage-target job by the image forming apparatus 10a is maintained even if the execute pause/print button image 189b is selected by the user, so that printing of the stoppage-target document is not to be executed.

In the above-described example, each image forming apparatus 10 receives a print job from the terminal apparatus 30 via the management server 50 and gives a command for, for example, stopping printing according to an identified related print job. In other words, in the above-described example, the image forming apparatus 10 acquires, from the management server 50, information about a print job generated by the terminal apparatus 30, and gives a command for, for example, stopping printing according to a related print job identified from the acquired information.

As an alternative to this configuration, the process to be performed by the image forming apparatus 10 may be performed by the terminal apparatus 30 or the management server 50. For example, a related print job, a related stoppage job, or a related deletion job may be identified by the management server 50.

Second Exemplary Embodiment

Information Processing System 2

Figure 16:
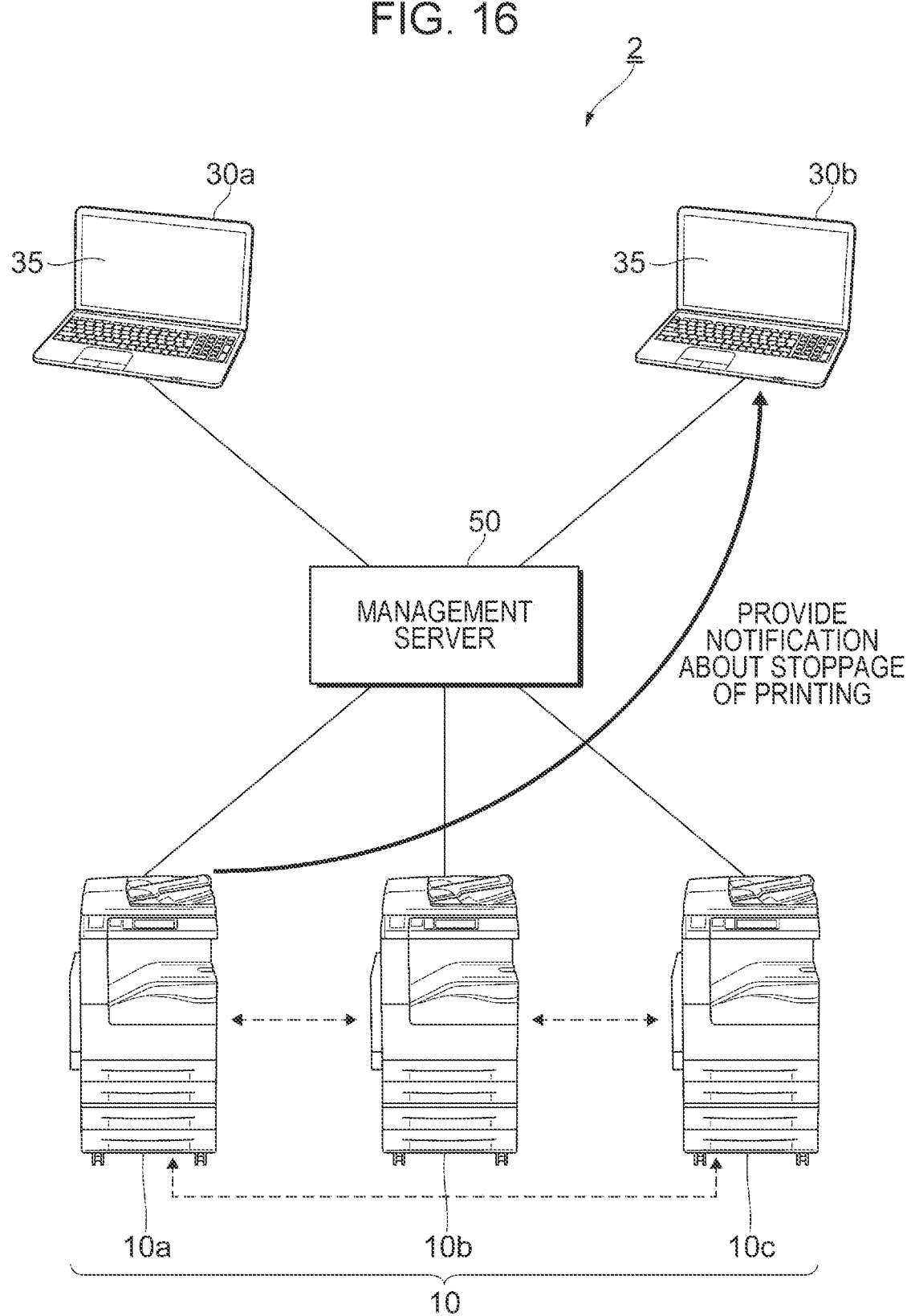
FIG. 16 illustrates an overall configuration example of an information processing system according to a second exemplary embodiment.

FIG. 16 illustrates an overall configuration example of an information processing system 2 according to a second exemplary embodiment.

The information processing system 2 according to the second exemplary embodiment is different from the information processing system 1 according to the first exemplary embodiment in that a print job registered by a second user different from the user who has registered the stoppage-target job is identified as a related print job. The differences from the first exemplary embodiment will be described below. Components that are identical to each other between the first exemplary embodiment and the second exemplary embodiment will be given the same reference signs, and detailed descriptions thereof will be omitted.

The information processing system 2 includes image forming apparatuses 10 (10a and 10b) that identify the print job registered by the second user as a related print job, terminal apparatuses 30 (30a and 30b), and a management server 50 having a function for providing a notification to the user who has registered the stopped print job in any of the image forming apparatuses 10.

In this exemplary embodiment, a print job to be identified as a related print job by any of the image forming apparatuses 10 includes a print job registered by the second user different from the user who has registered the stoppage-target job. In other words, a print job to be identified as a related print job by the image forming apparatus 10 includes a print job registered by the second user different from the user authenticated in the image forming apparatus 10.

More specifically, a print job to be identified by the image forming apparatus 10 as a related print job related to the print job registered by the user operating the image forming apparatus 10 is not limited to the print job registered by this user. A print job to be identified as a related print job also includes a print job registered by the second user different from the user operating the image forming apparatus 10.

For example, the image forming apparatus 10 gives a command regarding a related print job to a second image forming apparatus 10 retaining a print job that is identified as a related print job and that is registered by the second user different from the user authenticated by the image forming apparatus 10. An example of the command regarding a related print job is a command for stopping printing of the related document corresponding to the related print job or for deleting the related print job.

In this case, for example, before stopping printing of the related document corresponding to the related print job, the image forming apparatus 10 provides a notification to the second user who has registered the related print job in the second image forming apparatus 10. More specifically, the image forming apparatus 10 provides a notification via the management server 50 to the terminal apparatus 30b of the second user who has registered the related print job corresponding to the printing stoppage command.

Flow of Process

Figure 17:
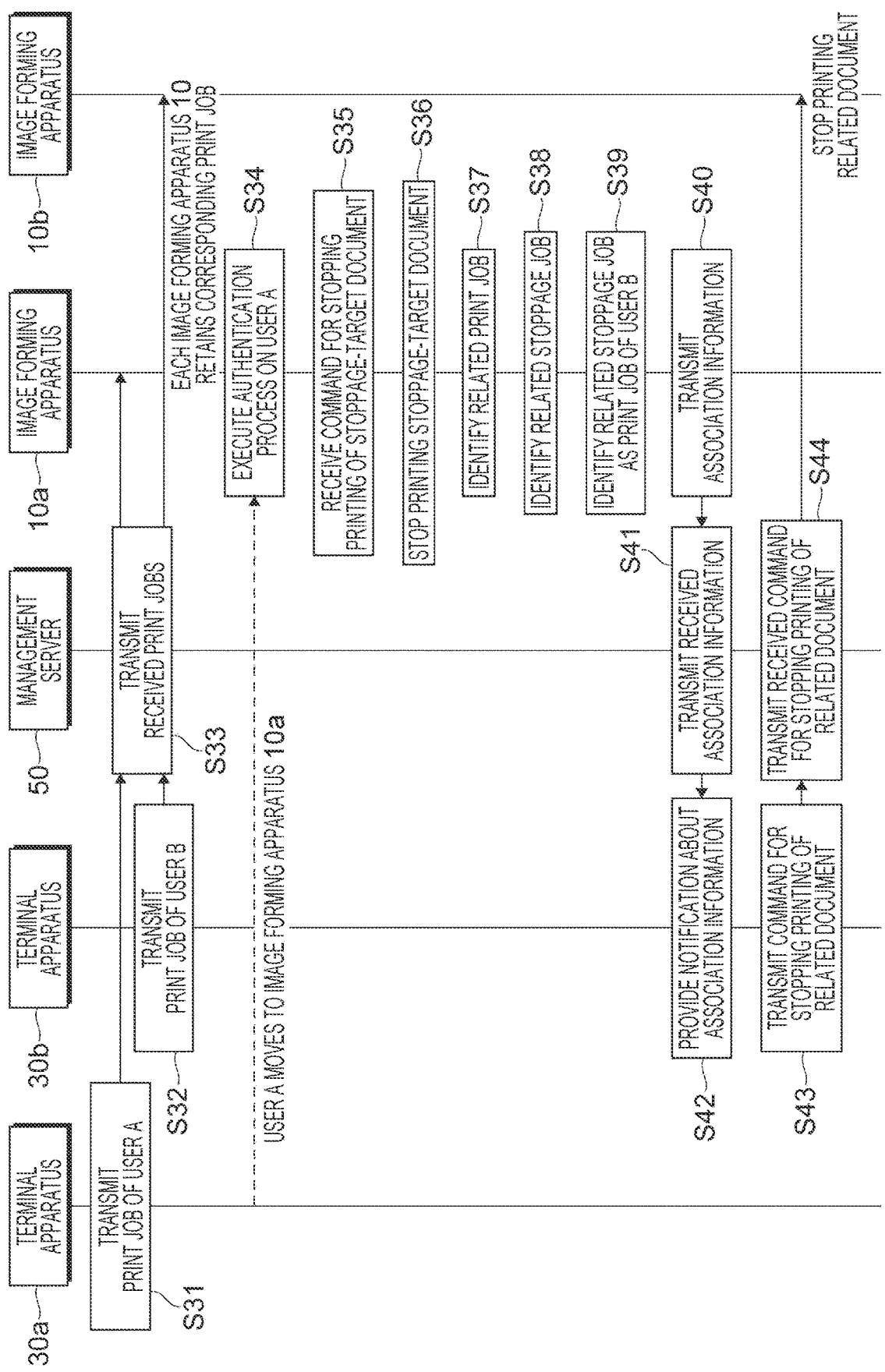
FIG. 17 illustrates an example of a process in which a second user different from the user operating the image forming apparatus is notified about a stoppage of printing of a related document in a processing sequence according to the second exemplary embodiment.

FIG. 17 illustrates an example of a process in which the second user different from the user operating the image forming apparatus 10a is notified about a stoppage of printing of a related document in a processing sequence according to the second exemplary embodiment.

It is assumed in this process that different users command different image forming apparatuses 10 to print documents via multiple terminal apparatuses 30.

FIG. 17 illustrates an example where a print job generated at the terminal apparatus 30a is retained by the image forming apparatus 10a and a print job generated at the terminal apparatus 30b is retained by the image forming apparatus 10b. Furthermore, a user giving a printing command via the terminal apparatus 30a will be referred to as "user A", and a second user different from the user A will be referred to as "user B".

First, in step S31, the terminal apparatus 30a transmits, to the management server 50, the print job of the user A generated for a document based on a printing command given by the user A.

In step S32, the terminal apparatus 30b transmits, to the management server 50, the print job of the user B generated for a document based on a printing command given by the user B different from the user A who has given the printing command via the terminal apparatus 30a.

In step S33, the management server 50 transmits the print jobs received from the terminal apparatuses 30a and 30b to the image forming apparatuses 10a and 10b responsible for printing. More specifically, the management server 50 transmits the print job of the user A received from the terminal apparatus 30a to the image forming apparatus 10a, and transmits the print job of the user B received from the terminal apparatus 30b to the image forming apparatus 10b.

The image forming apparatus 10a retains the received print job of the user A. The image forming apparatus 10b retains the received print job of the user B.

Subsequently, the user A who has given the printing command via the terminal apparatus 30a moves to the location where the image forming apparatus 10a is installed, and operates the image forming apparatus 10a.

In step S34, the image forming apparatus 10a executes an authentication process on the user A operating the image forming apparatus 10a. The image forming apparatus 10a authenticates the user A operating the image forming apparatus 10a from acquired user information. In other words, the image forming apparatus 10a identifies that the user A who has successfully completed the authentication is the user operating the image forming apparatus 10a.

When the authentication process is completed and the user A is identified, the display 18 of the image forming apparatus 10a displays information about the print job for the document that corresponds to the printing command given by the identified user A via the terminal apparatus 30a and that is to be printed by the image forming apparatus 10a. Moreover, information about a print job retained in another image forming apparatus 10 communicable with the image forming apparatus 10a may also be displayed. Information about a print job for a document corresponding to a printing command given from another terminal apparatus 30 different from the terminal apparatus 30a used by the identified user A may be displayed, or information about a print job for a document corresponding to a printing command given by the user B may be displayed.

Then, in step S35, the image forming apparatus 10a receives, from the user A, a command for stopping printing of a stoppage-target document that the image forming apparatus 10a is responsible for printing. The image forming apparatus 10a receives, from the user A, a command for stopping printing of the stoppage-target document corresponding to the print job of the user A.

In step S36, the image forming apparatus 10a stops printing the stoppage-target document corresponding to the received printing stoppage command.

Subsequently, in step S37, the image forming apparatus 10a identifies one or more related print jobs related to the stoppage-target job of the stoppage-target document for which printing has been stopped. In other words, the image forming apparatus 10a identifies one or more related documents related to the stoppage-target document for which printing has been stopped.

In addition to the print job of the user A, the image forming apparatus 10a has acquired information about the print job of the user B from the management server 50. The one or more related print jobs include not only the print job of the user A but also the print job of the user B.

Then, in step S38, the image forming apparatus 10a identifies a related stoppage job to be stopped in relation to the stoppage of the stoppage-target job from the related print jobs. More specifically, the image forming apparatus 10a identifies a related stoppage job by determining whether or not printing of the related document corresponding to the related print job is to be stopped.

In step S39, the image forming apparatus 10a identifies that the related stoppage job of the related document for which printing is to be stopped is the print job of the user B. In other words, the image forming apparatus 10a identifies that printing of the identified related document that is to be stopped corresponds to the printing command given by the user B.

In step S40, the image forming apparatus 10a transmits association information between the stoppage-target job of the user A and the related print job of the user B to the management server 50.

Although not described above, in this exemplary embodiment, there may be a case where the image forming apparatus 10a transmits information to the management server 50 and also commands the image forming apparatus 10b retaining the related print job to pause printing of this related document. In this case, the image forming apparatus 10b keeps the printing process for the related document in a pending mode until receiving a command from the user B. In other words, the image forming apparatus 10b prevents printing of the related document from being executed until receiving a command from the user B.

Then, in step S41, the management server 50 transmits the association information received from the image forming apparatus 10a operated by the user A to the terminal apparatus 30b operated by the user B.

In step S42, the terminal apparatus 30b provides a notification about the association information received from the management server 50.

The following description relates to display based on information received from the management server 50 as an example of a notification about a stoppage of printing of the related document.

Figure 18:
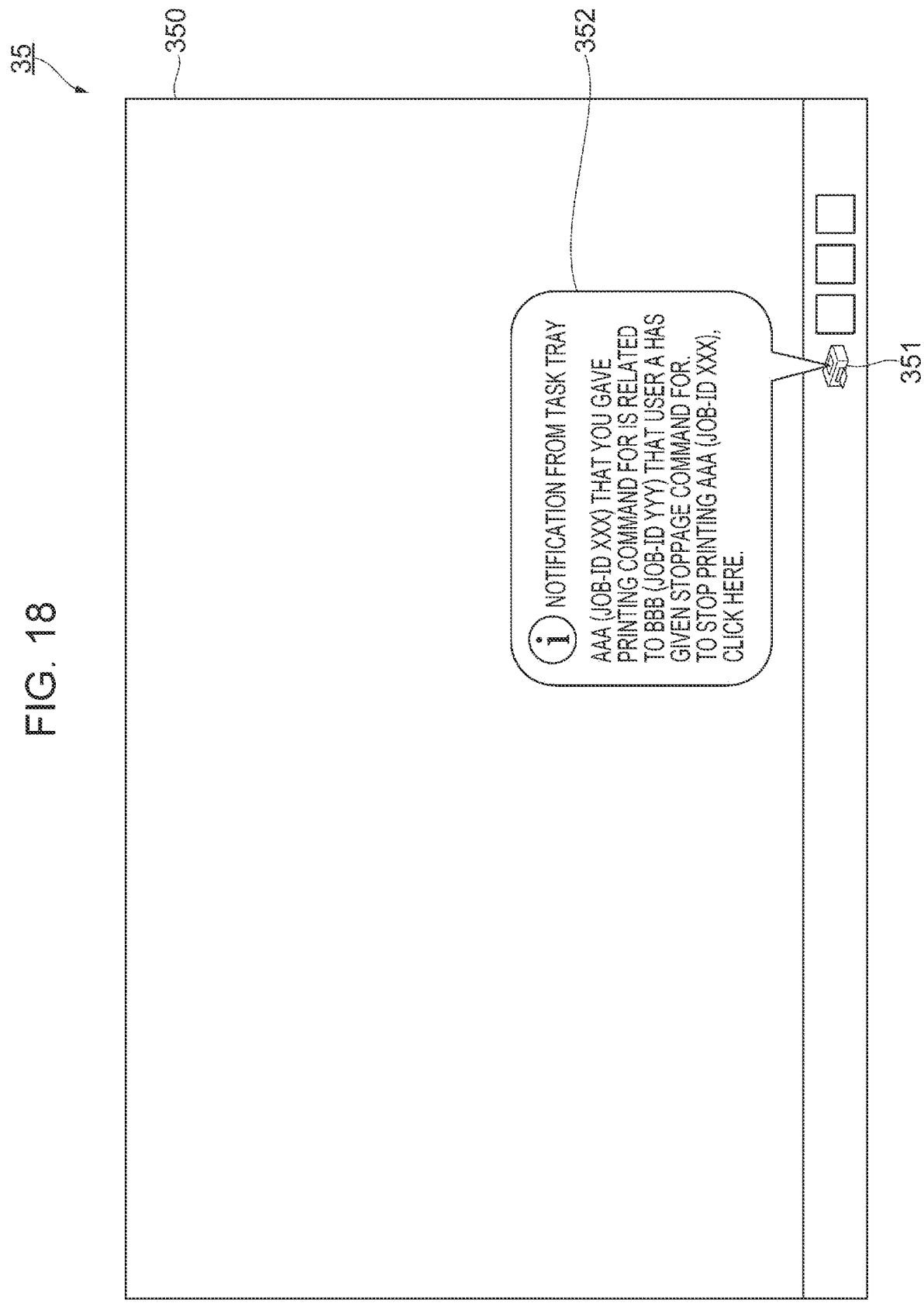
FIG. 18 illustrates an example of a screen that provides a notification about the stoppage of printing of the related document.

FIG. 18 illustrates an example of a screen that provides the notification about the stoppage of printing of the related document.

The display 35 of the terminal apparatus 30b displays a display image 350 including an image 351 indicating the status of the image forming apparatus 10b retaining a print job corresponding to a document for which a printing command is given by the user B. If the document corresponding to the printing command given by the user B is related to a stoppage-target document corresponding to a printing stoppage command given by the user A, a notification image 352 providing a notification about the stoppage of printing of the document corresponding to the printing command given by the user B is displayed on the display image 350.

In the display example shown in FIG. 18, the notification image 352 displays a text message indicating that the related document corresponding to the printing command given by the user B operating the terminal apparatus 30b and the stoppage-target document corresponding to the printing stoppage command given by the user A operating the image forming apparatus 10a are related to each other. Furthermore, the notification image 352 displays a text message demanding the user B to give a command for stopping printing of the related document corresponding to the printing command given by the user B.

Subsequently, in step S43, the terminal apparatus 30b transmits, to the management server 50, the command for stopping printing of the related document based on an operation performed by the user B.

In step S44, the management server 50 transmits the command for stopping printing of the related document received from the terminal apparatus 30b to the image forming apparatus 10b responsible for printing the related document.

Based on the command for stopping printing of the related document received from the management server 50, the image forming apparatus 10b stops printing the related document.

The notification about the stoppage of printing of the related document in the second exemplary embodiment is not limited. Instead of demanding the command for the stoppage of printing of the document corresponding to the printing command given by the user B, a notification indicating that printing of the related document corresponding to the printing command given by the user B has been stopped may be provided.

Furthermore, for example, the notification image 352 shown in FIG. 18 may display a text message demanding the user B to give a command for cancelling the stopped state of printing with respect to the document corresponding to the printing command given by the user B.

Alternatively, the terminal apparatus 30 may provide the notification by using, for example, a picture, sound, or light. As another alternative, for example, an electronic mail may be transmitted to the user B.

So long as the notification about the stoppage of printing of the related document is provided toward the user B, the notification destination is not limited to the terminal apparatus 30b where the print job corresponding to the related document is generated.

Third Exemplary Embodiment

Figure 19:
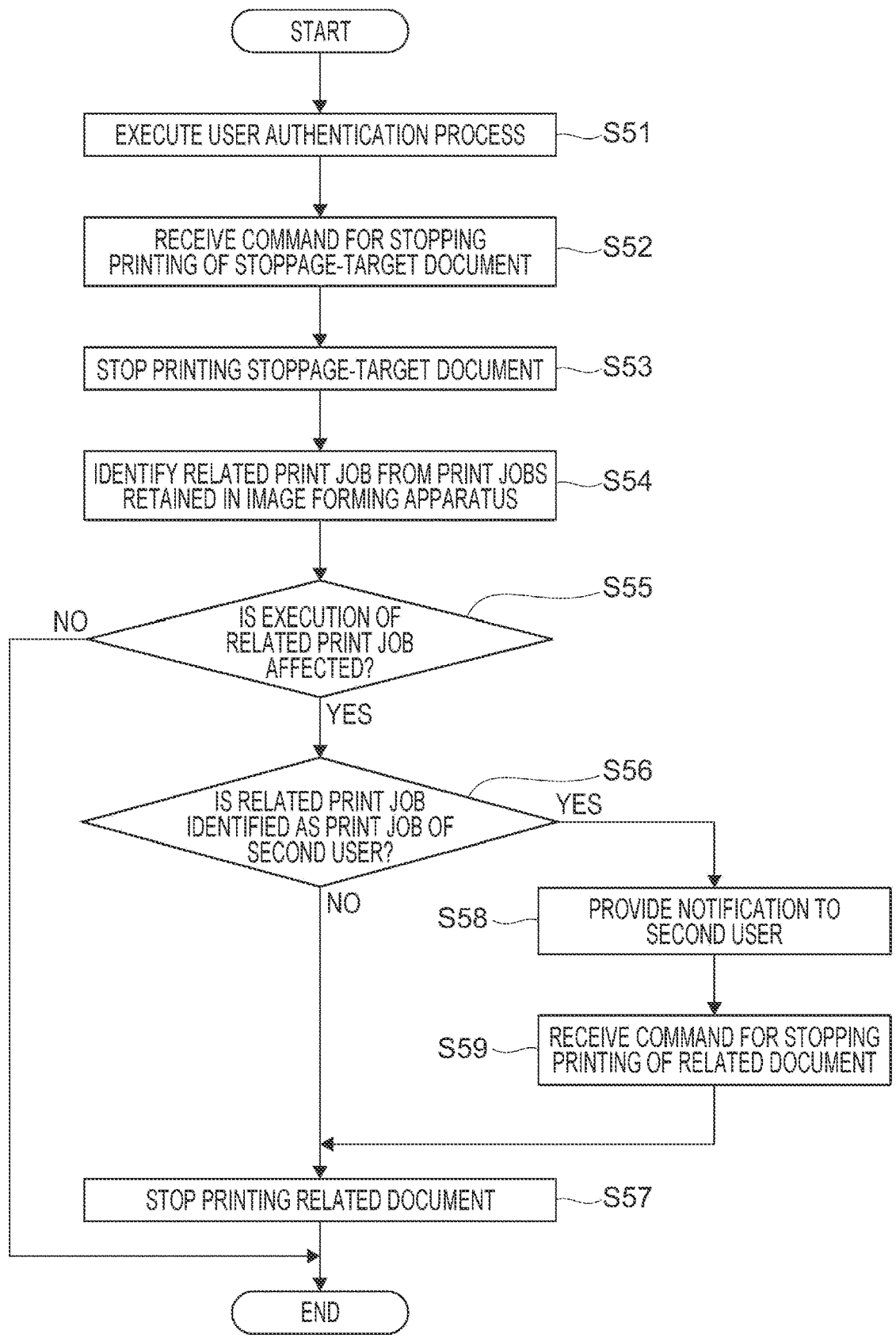
FIG. 19 is a flowchart illustrating the flow of a process in which an image forming apparatus according to a third exemplary embodiment gives a command for stopping printing of a related document corresponding to a related print job retained therein.

FIG. 19 is a flowchart illustrating the flow of a process in which an image forming apparatus 10 according to a third exemplary embodiment gives a command for stopping printing of a related document corresponding to a related print job retained therein.

It is assumed in this process that each of multiple users commands the image forming apparatus 10 to print a document.

The example in FIG. 19 corresponds to a case where the image forming apparatus 10 retains a print job corresponding to a document for which a printing command is given by a second user different from the user operating the image forming apparatus 10.

In step S51, the image forming apparatus 10 executes an authentication process on the user operating the image forming apparatus 10. The image forming apparatus 10 authenticates the user operating the image forming apparatus 10 from acquired user information. In other words, the image forming apparatus 10 identifies that the user who has successfully completed the authentication is the user operating the image forming apparatus 10.

When the authentication process is completed and the user is identified, the display 18 of the image forming apparatus 10 displays information about the print job for the document that corresponds to the printing command given by the identified user via the terminal apparatus 30 and that is to be printed by the image forming apparatus 10. Moreover, information about a print job retained in another image forming apparatus 10 communicable with the image forming apparatus 10 may also be displayed. Information about a print job for a document corresponding to a printing command given from another terminal apparatus 30 different from the terminal apparatus 30 used by the identified user may be displayed, or information about a print job for a document corresponding to a printing command given by another user may be displayed.

In step S52, the image forming apparatus 10 receives, from the authenticated user, a command for stopping printing of a stoppage-target document that the image forming apparatus 10 is responsible for printing.

In step S53, the image forming apparatus 10 stops printing the stoppage-target document corresponding to the received printing stoppage command. In other words, the image forming apparatus 10 stops the stoppage-target job of the stoppage-target document.

In step S54, the image forming apparatus 10 identifies a related print job related to the stoppage-target job from print jobs retained in the image forming apparatus 10. In other words, the image forming apparatus 10 identifies a related document related to the stoppage-target document from documents that the image forming apparatus 10 is responsible for printing.

Subsequently, in step S55, the image forming apparatus 10 determines whether the cause of the stoppage of printing of the stoppage-target document for which printing has been stopped affects the execution of the related print job. In other words, it is determined whether or not printing of the related document corresponding to the identified related print job is to be stopped.

If the cause of the stoppage of printing of the stoppage-target document for which printing has been stopped does not affect the execution of the identified related print job (NO in step S55), the image forming apparatus 10 ends the process.

If the cause of the stoppage of printing of the stoppage-target document for which printing has been stopped affects the execution of the identified related print job in step S55 (YES in step S55), the image forming apparatus 10 identifies whether or not this related print job is a print job of a second user different from the authenticated user in step S56.

If the related print job is identified as a print job of the authenticated user (NO in step S56), the image forming apparatus 10 stops printing the related document corresponding to this related print job in step S57.

If the related print job is identified as a print job of the second user in step S56 (YES in step S56), the image forming apparatus 10 provides a notification to the identified second user via the management server 50 in step S58. For example, the image forming apparatus 10 notifies the identified second user that a command is given for printing the related document related to the stoppage-target document for which printing has been stopped.

Subsequently, in step S59, the image forming apparatus 10 receives, from the second user, the command for stopping printing of the related document corresponding to the related print job via the management server 50.

In step S57, the image forming apparatus 10 stops printing the related document that the image forming apparatus 10 is responsible for printing based on the received command given by the second user.

Although not described above, in this exemplary embodiment, there may be a case where the image forming apparatus 10 does not receive a command for stopping printing of the related document from the second user. In this case, the image forming apparatus 10 keeps the printing process for the related document in a pending mode until receiving a command from the second user. Furthermore, the image forming apparatus 10 may cancel the pending mode for printing the related document when receiving a command from the second user for not stopping printing of the related document or a command for not deleting the related print job.

Fourth Exemplary Embodiment

Figure 20:
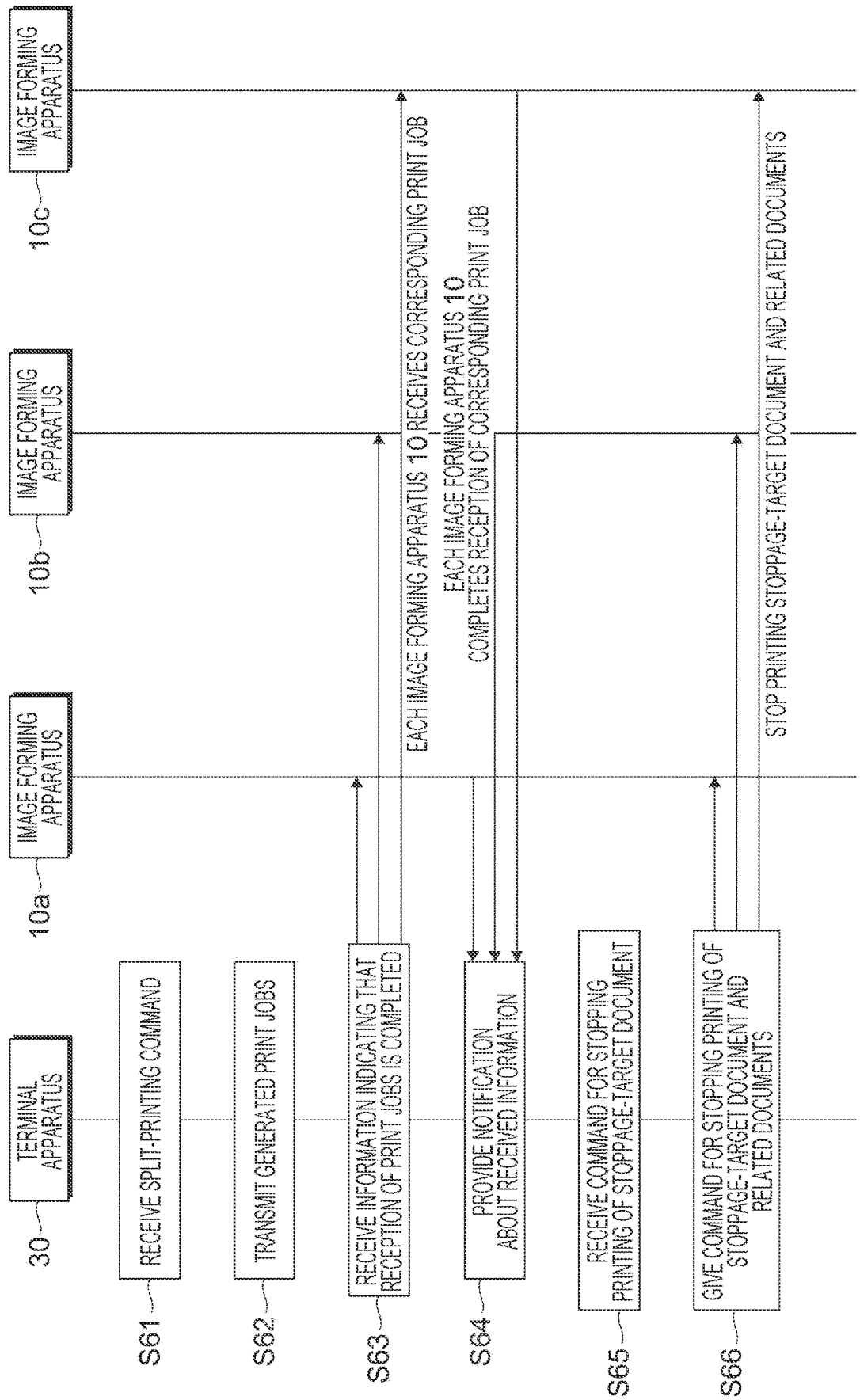
FIG. 20 illustrates an example of a process in which the terminal apparatus gives printing commands to multiple image forming apparatuses in a processing sequence according to a fourth exemplary embodiment.

FIG. 20 illustrates an example of a process in which the terminal apparatus 30 gives printing commands to multiple image forming apparatuses 10 in a processing sequence according to a fourth exemplary embodiment.

It is assumed in this process that a command given by the user is transmitted from the terminal apparatus 30 to each image forming apparatus 10 without the intervention of the management server 50.

The example in FIG. 20 corresponds to a case where printing commands are given to different image forming apparatuses 10 for respective page bundles split from a single document.

First, in step S61, the terminal apparatus 30 receives, from the user, a split-printing command for splitting a single document into multiple page bundles and printing the page bundles. For example, the terminal apparatus 30 receives, from the user, a command for splitting a single document into three page bundles and printing the page bundles.

In step S62, the terminal apparatus 30 transmits, to the image forming apparatuses 10 responsible for printing, print jobs generated for the respective page bundles based on the printing command given by the user. For example, the terminal apparatus 30 transmits a print job for a first page bundle to the image forming apparatus 10a, a print job for a second page bundle to the image forming apparatus 10b, and a print job for a third page bundle to the image forming apparatus 10c.

The image forming apparatuses 10 transmit, to the terminal apparatus 30, information indicating that reception of the print jobs from the terminal apparatus 30 is completed. For example, each image forming apparatus 10 transmits, to the terminal apparatus 30, information indicating that the print job that the image forming apparatus 10 is responsible for printing is retained in the image forming apparatus 10.

In step S63, the terminal apparatus 30 receives, from image forming apparatuses 10, the information indicating that the reception of the print jobs is completed.

In step S64, the terminal apparatus 30 provides a notification about the information received from each image forming apparatus 10. The terminal apparatus 30 may provide the notification by using, for example, a text message, a picture, sound, or light, or a combination thereof.

Subsequently, in step 365, the terminal apparatus 30 receives, from the user, a command for stopping printing of a stoppage-target document serving as any one of the multiple page bundles.

In step S66, the terminal apparatus 30 commands the image forming apparatuses 10 responsible for printing the respective page bundles to stop printing the stoppage-target document serving as the page bundle corresponding to the received printing stoppage command and stop printing related documents serving as the remaining page bundles split from the same document as the aforementioned page bundle.

Based on the received printing stoppage command, the image forming apparatuses 10 stop printing the respective page bundles corresponding to the stoppage-target document and the related documents.

In this exemplary embodiment, the print jobs for the page bundles split from the single document are identified as related print jobs. Alternatively, if a second document different from the document corresponding to the printing stoppage command given by the user satisfies a specific condition, a print job for the second document may be identified as a related print job.

As another alternative, similar to the other exemplary embodiments, if a print job for a document corresponding to a printing command given by a second user different from the user giving a command via the terminal apparatus 30 is identified as a related print job, a notification may be provided to the second user.

As yet another alternative, similar to the printing stoppage command, a command for deleting a print job may be transmitted.

Fifth Exemplary Embodiment

Figure 21:
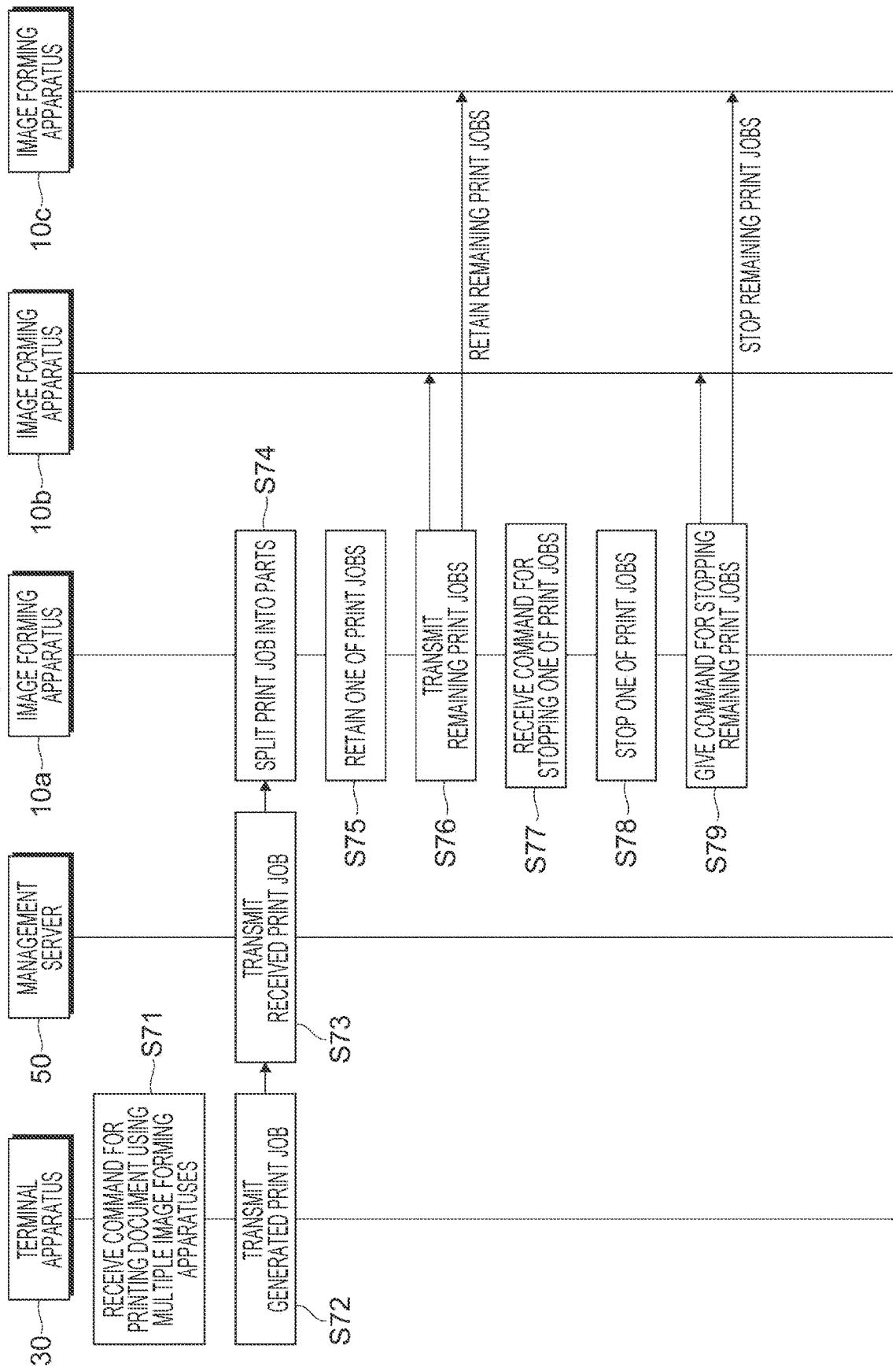
FIG. 21 illustrates an example of a process in which an image forming apparatus transmits a print job to other image forming apparatuses in a processing sequence according to a fifth exemplary embodiment.

FIG. 21 illustrates an example of a process in which the image forming apparatus 10a transmits a print job to other image forming apparatuses 10 in a processing sequence according to a fifth exemplary embodiment.

It is assumed in this process that a command for printing a document by using multiple image forming apparatuses 10 is transmitted to the image forming apparatus 10a.

The example in FIG. 21 corresponds to a case where the image forming apparatus 10a splits a single document into parts.

First, in step S71, the terminal apparatus 30 receives, from the user, a command for printing a document using multiple image forming apparatuses 10. In the command for printing the document using the multiple image forming apparatuses 10, the user may designate, for example, the types and the number of image forming apparatuses 10 to be used. If the image forming apparatuses 10 are managed as a group such that multiple image forming apparatuses 10 are collectively identifiable, the user may designate this group.

Subsequently, in step S72, the terminal apparatus 30 transmits, to the management server 50, a print job generated for the document based on the printing command given by the user.

In step S73, the management server 50 transmits the received print job for the document to the image forming apparatus 10a.

In step S74, the image forming apparatus 10a splits the received print job into parts. For example, the image forming apparatus 10a receives the print job corresponding to the document having multiple pages, splits the document corresponding to this print job into multiple page bundles, and generates multiple print jobs.

In step S75, the image forming apparatus 10a retains one of the split print jobs therein. In other words, the image forming apparatus 10a retains therein any one of the split print jobs.

In step S76, the image forming apparatus 10a transmits the remaining parts of the print job different from the aforementioned print job retained in the image forming apparatus 10a to the remaining image forming apparatuses 10. For example, the image forming apparatus 10a transmits the print jobs to image forming apparatuses 10 designated by the user or to image forming apparatuses 10 retaining a small number of print jobs among the multiple image forming apparatuses 10.

Each of the multiple image forming apparatuses 10 retains the received print job.

The user moves to the location where the image forming apparatus 10a is installed, so as to operate the image forming apparatus 10a.

In step S77, the image forming apparatus 10a receives, from the user, a command for stopping the aforementioned print job retained in the image forming apparatus 10a. In other words, the image forming apparatus 10a receives, from the user, a command for stopping printing of the stoppage-target document that the image forming apparatus 10a is responsible for printing.

In step S78, the image forming apparatus 10a stops the aforementioned print job corresponding to the received stoppage command.

In step S79, the image forming apparatus 10a commands the remaining image forming apparatuses 10 retaining the remaining print jobs serving as related print jobs related to the aforementioned print job to stop the remaining print jobs. In other words, the image forming apparatus 10a commands the remaining image forming apparatuses 10 responsible for printing related documents corresponding to related stoppage jobs to stop printing the related documents.

In this exemplary embodiment, the image forming apparatus 10a identifies multiple print jobs generated by splitting a single print job as related print jobs.

Based on the printing stoppage command from the image forming apparatus 10a, the remaining image forming apparatuses 10 stop the remaining print jobs retained therein. In other words, the remaining image forming apparatuses 10 stop printing the related documents corresponding to related stoppage jobs retained therein.

In each of the above exemplary embodiments, the programs to be executed by the CPUs 11a (see FIG. 2) and 21a (see FIG. 5) serving as an example of processors may be provided to the controllers 11 and 21 by being stored in a computer-readable storage medium, such as a magnetic storage medium (e.g., magnetic tape or a magnetic disk), an optical storage medium (e.g., an optical disk), a magneto-optical storage medium, or a semiconductor memory. Alternatively, the programs to be executed by the CPUs 11a and 21a may be downloaded to the image forming apparatus 10, the terminal apparatus 30, and the management server 50 by using a communication unit, such as the Internet.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The process performed by the information processing system according to each of the above exemplary embodiments is prepared as a program, such as application software. This program may be provided by a communication unit or may be provided by being stored in a storage medium, such as a compact disc read-only memory (CD-ROM).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
receive a command for stopping a print job of a document from a user, the print job being registered in the image forming apparatus;
identify a related print job that is different from the print job and related to the print job, the related print job being registered in a second image forming apparatus; and
command the second image forming apparatus to stop the related print job.

2. The image forming apparatus according to claim 1, wherein the processor is configured to cause a display to display information about a command for printing the related print job that the second image forming apparatus is responsible for printing, the display displaying a screen that receives an operation performed by a user for giving a command for stopping printing of the print job.

3. The image forming apparatus according to claim 2, wherein the processor is configured to cause the display to display an image indicating a content of the related print job corresponding to the information displayed on the display.

4. The image forming apparatus according to claim 1, wherein the processor is configured to not give the command for stopping printing of the related print job if the related print job satisfies a first condition related to the stoppage of printing.

5. The image forming apparatus according to claim 4, wherein the first condition is such that printing of the related print job is not affected by a cause of the stoppage of printing of the print job.

6. The image forming apparatus according to claim 1, wherein the processor is configured to give the command for stopping printing of the related print job if the related print job satisfies a second condition related to the stoppage of printing.

7. The image forming apparatus according to claim 6, wherein the second condition is such that printing of the related print job is affected by a cause of the stoppage of printing of the print job.

8. The image forming apparatus according to claim 1, wherein the processor is configured to command the second image forming apparatus to delete the command for printing the related print job based on a predetermined condition.

9. The image forming apparatus according to claim 8, wherein the predetermined condition is such that a user has selected to delete the command for printing the related print job for which printing is stopped.

10. The image forming apparatus according to claim 1, wherein, in a case where the related print job includes a plurality of related print jobs, the processor is configured to give the command for stopping printing of all the related print jobs.

11. The image forming apparatus according to claim 1, wherein, in a case where the stoppage of printing of the print job is received from a user, the processor is configured to stop printing of the related print job when a command that is given by a second user and that is related to printing of the related print job is retained in the image forming apparatus.

12. The image forming apparatus according to claim 11, wherein the processor is configured to provide a notification to the second user before printing of the related print job is stopped.

13. The image forming apparatus according to claim 1, wherein, in a case where a first user giving a command for printing the print job and a second user giving a command for printing the related print job are different from each other, the processor is configured to provide a notification to the second user before printing of the related print job is stopped.

14. The image forming apparatus of claim 1, wherein the processor is further configured to:

perform the print job in response to receiving a command for performing the print job from the user prior to receiving a command for stopping the print job; and stop the print job registered in the image forming apparatus in response to receiving the command for stopping the print job from the user.

15. A non-transitory computer readable medium storing a program causing a computer to execute a process, the process comprising:

receiving a command for stopping a print job of a document from a user, the print job being registered in the computer;

identifying a related print job that is different from the print job and related to the print job, the related print job being registered in an image forming apparatus; and commanding the image forming apparatus to stop the related print job.

16. A method for stopping printing in an information processing system including a plurality of image forming apparatuses, the method comprising:

receiving a command for stopping a print job of a document from a user, the print job being registered in a first image forming apparatus;

identifying a related print job that is different from the print job and related to the print job, the related print job being registered in a second image forming apparatus; and commanding the second image forming apparatus to stop the related print job.

* * * * *